US008352297B1

(12) United States Patent
Gil et al.

(10) Patent No.: US 8,352,297 B1
(45) Date of Patent: Jan. 8, 2013

(54) SUPPLY CHAIN MANAGEMENT

(75) Inventors: Reynaldo Gil, Palo Alto, CA (US); Dipayan Gangopadhyay, San Jose, CA (US); Jay Zhou, Fremont, CA (US); Simeon Gordon, Fairbun, GA (US); Sandeep Nayak, Fremont, CA (US)

(73) Assignee: Parametric Technology Corporation, Needham, MA (US)

( * ) Notice: Subject to any disclaimer, the term of this patent is extended or adjusted under 35 U.S.C. 154(b) by 109 days.

(21) Appl. No.: 12/605,773

(22) Filed: Oct. 26, 2009

Related U.S. Application Data

(62) Division of application No. 10/028,542, filed on Dec. 19, 2001, now Pat. No. 7,761,319.

(60) Provisional application No. 60/297,018, filed on Jun. 8, 2001.

(51) Int. Cl.
 *G06Q 10/00* (2006.01)
(52) U.S. Cl. .......................... 705/7.11; 705/7
(58) Field of Classification Search ............. 705/7, 7.11
 See application file for complete search history.

(56) References Cited

U.S. PATENT DOCUMENTS

| 5,937,388 | A  | * | 8/1999  | Davis et al. ...................... 705/8 |
| 5,983,198 | A  |   | 11/1999 | Mowery et al. |
| 6,510,216 | B1 |   | 1/2003  | Burr et al. |
| 6,937,993 | B1 | * | 8/2005  | Gabbita et al. ................... 705/8 |
| 7,051,072 | B2 | * | 5/2006  | Stewart et al. .................. 709/204 |
| 7,069,235 | B1 |   | 6/2006  | Postelnik et al. |
| 7,216,086 | B1 |   | 5/2007  | Grosvenor et al. |
| 2002/0010741 | A1 | | 1/2002 | Stewart et al. |
| 2002/0099579 | A1 | | 7/2002 | Stowell et al. |
| 2002/0099580 | A1 | | 7/2002 | Eicher et al. |
| 2002/0178070 | A1 | | 11/2002 | Leveridge |
| 2003/0018701 | A1 | | 1/2003 | Kaestle et al. |

OTHER PUBLICATIONS

Johnson, et al., An emerging version of Internet-Enabled Supply Chain Electronic Commerce, Department of Information, Dec. 2000:1-24.
Yang, et al., Interoperation Support for Electronic Business, Communications of ACM, Jun. 2000(6):1-9.
Lambert, et al., Issues in Supply Chain Management, Industrial Marketing Management, Dec. 2000:1-19.
Xu, K., et al., Towards better coordination of the supply chain, Transportation Research Part E 37, Jan. 2000:35-54.
Huang, et al., Development of a Collaborative and Event-Driven Supply Chain Information System Using Mobile Object Technology, International Conference on Robotics & Automation, May 1999:1776-1781.
The ATM Forum Technical Committee, M4 Interface Requirements and Logical MIB, Oct. 1994:1-91.

\* cited by examiner

*Primary Examiner* — Romain Jeanty
(74) *Attorney, Agent, or Firm* — Greenberg Traurig, LLP; David J. Dykeman

(57) ABSTRACT

A system and a method for managing a supply chain are provided. A request for a transaction involving an enterprise and at least one partner in a supply chain is received from an end-user or the partner. Real-time data relevant to the transaction is accessed from an existing partner system. A context for the transaction is generated using the real-time data. The request is processed in the context for the transaction.

9 Claims, 20 Drawing Sheets

WORLDCHAIN

Welcome Bob Miller [Logout] — 372  My Account  Help

Alerts
You have 5 Alerts [View] — 374

Documentation
📁 Documentation
├─ 📄 WorldChain Service Documentation
└─ 📄 WorldChain Tools Documentation

Tasks
- Xfer Inventory Between Locations
- Check Inventory Quantity
- Customer Master Inquiry
- Sales Order Inquiry
- Shipment Inquiry
- Carrier Inquiry
- More Tasks...

376

Depot Inventory Levels — 378

| Status | Order | Customer | Location | Value of Inventory | Value of aged Inv. |
|---|---|---|---|---|---|
| ● | 213 | Southern Hub | Houston, TX | $901,546,000 | $45,201 |
| ○ | 202 | Florida Depot | Orlando, FL | $420,445,000 | $52,990 |
| ● | 213 | Texas Depot | Dallas, TX | $425,000 | $21,656 |
| ● | 199 | Georgia Depot | Atlanta, GA | $561,010,000 | $66,000 |
| ● | 213 | West Hub | Pheonix, AZ | $652,998,000 | $55,000 |
| ○ | 202 | Oregon Depot | Portland, OR | $25,042 | $5,233 |
| ● | 199 | Ncal Depot | Belmont, CA | $125,542,000 | $15,255 |

Reports

Daily Dispatches — 380, 382
○ Daily Dispatches
□ Missed SLAs

Weekly Dispatches — 384
○ Weekly Dispatches
□ Missed SLAs

SUPPLY CHAIN MANAGEMENT

RELATED APPLICATIONS

This application is a divisional application of U.S. application Ser. No. 10/028,542, filed on Dec. 19, 2001, which claims priority to U.S. Provisional Patent Application No. 60/297,018, filed on Jun. 8, 2001, the entirety of these applications are hereby incorporated herein by reference for the teachings therein.

COPYRIGHT AND TRADEMARK NOTICE

A portion of the disclosure of this patent document contains material which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or limit the scope of this invention to material associated only with such marks.

FIELD OF THE INVENTION

The present invention relates to techniques for coordinating a supply chain and, more particularly, to supply chain management.

BACKGROUND

Vertically integrated, centrally managed business models are rapidly giving way to decentralized business models leveraging outsourcing. Original equipment manufacturers (OEMs) are responding to cost and competitive issues by divesting operations and outsourcing key functions, such as manufacturing, distribution, logistics, service, and inventory management. The rationale behind outsourcing is simple: focus on core competencies, and for everything else, transfer responsibility to various types of service providers (or "partners") who can employ economies of scale and provide geographic coverage for product distribution, service, and manufacturing.

In addition to its common sense appeal, outsourcing has delivered significant financial value to both the OEMs and the growing clusters of companies that support them. Outsourcing, however, along with globalization and system/application proliferation, has caused a dramatic increase in complexity across supply chains due to the lack of information systems to coordinate operations. Consequently, many companies have instituted enterprise and collaborative planning across supply chains.

Recent initiatives in outsourcing and collaborative planning have exposed a critical flaw in today's extended supply chains: they are not configured for the efficient execution that was once possible when companies were vertically integrated. Managing a supply chain has become an extremely complex task that previously developed systems with an enterprise-focused approach cannot adequately support. These enterprise systems were designed to support one centralized, static, standardized business process, as opposed to business processes governed by individual business agreements. Furthermore, collaborative planning solutions do not coordinate execution across supply chains. Instead, they focus on macro-level parameters, long planning horizons, and data that is frozen days or even weeks before and after events actually occur. The primary challenge remains unmet: effectively coordinating execution of actions and events across a supply chain even as service and lead-time requirements become more stringent and partners come and go.

SUMMARY

In one embodiment of the present invention, a method for managing a supply chain is provided. A request for a transaction involving an enterprise and at least one partner in a supply chain is received from an end-user or the partner. Real-time data relevant to the transaction is accessed from an existing partner system. A context for the transaction is generated using real-time data. The request is processed in the context for the transaction.

In another embodiment of the present invention, a system for managing a supply chain is provided. The system may include an interface and a processing facility. The interface is operable to receive the request for the transaction from the end-user or the partner. The interface is in communication with the processing facility. The processing facility is operable to access real-time data relevant to the transaction from an existing partner system, to generate a context for the transaction using the real-time data, and to process the request in the context for the transaction.

In some embodiments of the present invention, the system may include a database and an execution process engine. The database is operable to store real-time data relating to one or more transactions and to maintain a respective context for each transaction. The execution process engine is operable to execute a respective workflow in the context for each transaction using the real-time data. Each workflow may include a plurality of tasks to be performed by the enterprise or the partner in order to fulfill the respective transaction.

In still another embodiment of the present invention, the system may include a database, at least one process workflow executing on a processing facility, and a data access layer. The database is operable to store real-time data relating to the transaction. The process workflow is operable to process the transaction. The data access layer is operable to provide the process workflow access to the real-time data relating to the transaction, thereby providing a context for the transaction during processing.

In yet another embodiment of the present invention, the system may include a network execution component and a network domain gateway. The network execution component is operable to administer a transaction involving an enterprise and at least one partner in a supply chain. The network execution component is in communication with the network domain gateway. The network domain gateway is operable to communicate with a partner coordinator component integrated with an existing system of the partner to provide real-time data relevant to the transaction from the existing system of the partner to the network execution component.

BRIEF DESCRIPTION OF THE DRAWINGS

For a more complete understanding of the present invention and for further features and advantages, reference is now made to the following description, taken in conjunction with the accompanying drawings, in which:

FIG. 15 illustrates a screen shot for a graphical user interface, according to an embodiment of the present invention;

DETAILED DESCRIPTION

Figure 1:
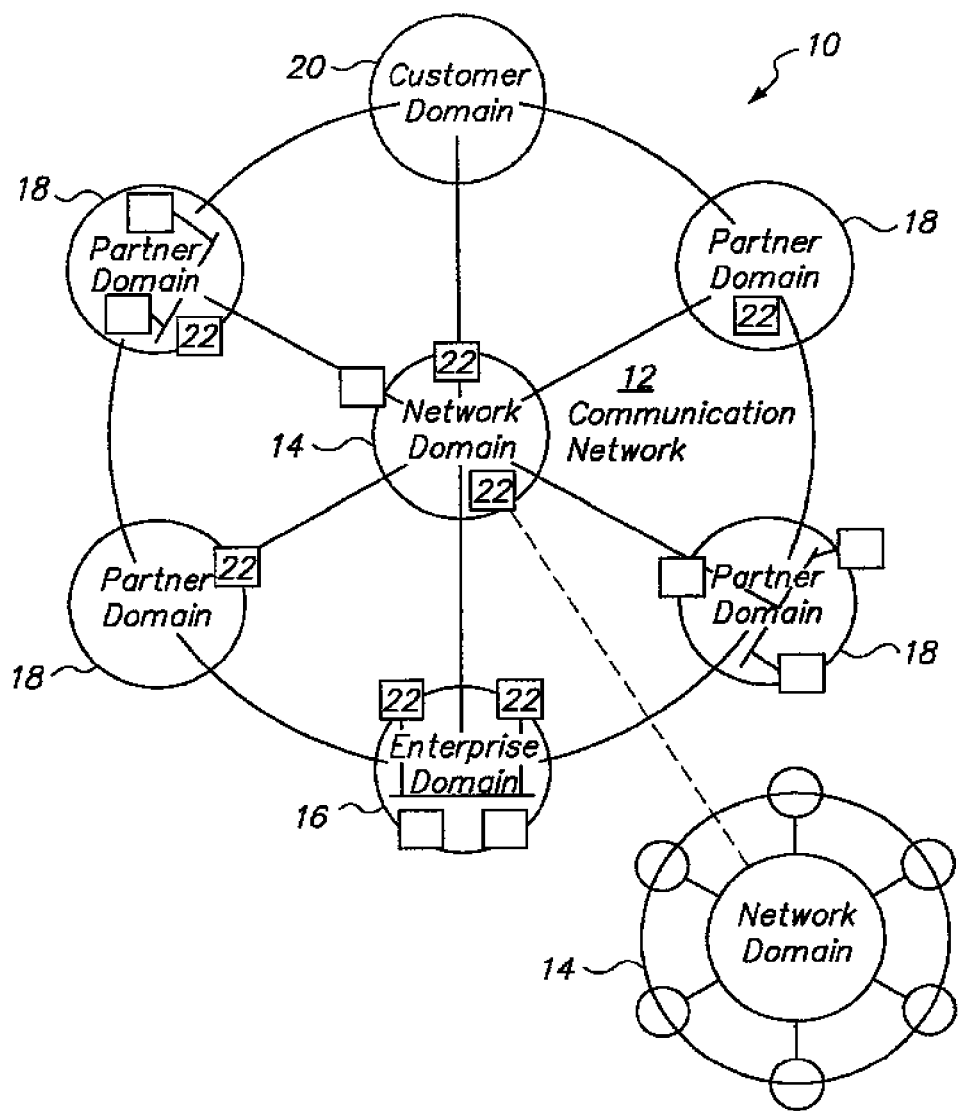
FIG. 1 illustrates a network for managing a supply chain, according to an embodiment of the present invention.

The embodiments of the present invention and their advantages are best understood by referring to FIGS. 1-18 of the drawings. Like numerals are used for like and corresponding parts of the various drawings.

Turning first to the nomenclature of the specification, the detailed description which follows is represented largely in terms of processes and symbolic representations of operations performed by conventional computer components, such as a local or remote central processing unit (CPU), processor, server, or other suitable processing device associated with a general purpose or specialized computer system, memory storage devices for the processing device, and connected local or remote pixel-oriented display devices. These operations may include the manipulation of data bits by the processing device and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer system are often referred to in terms such as adding, comparing, moving, searching, or the like, which are often associated with manual operations performed by a human operator. It must be understood that no involvement of the human operator may be necessary, or even desirable, in the present invention. The operations described herein are machine operations performed in conjunction with the human operator or user that interacts with the computer or system.

In addition, it should be understood that the programs, processes, methods, and the like, described herein are but an exemplary implementation of the present invention and are not related, or limited, to any particular computer, system, apparatus, or computer language. Rather, various types of general purpose computing machines or devices may be used with programs constructed in accordance with the teachings described herein. Similarly, it may prove advantageous to construct a specialized apparatus to perform one or more of the method steps described herein by way of dedicated computer systems with hard-wired logic or programs stored in non-volatile memory, such as read-only memory (ROM).

Network for Managing a Supply Chain

Referring now to the drawings, FIG. 1 illustrates a network 10 for managing a supply chain, according to an embodiment of the present invention. In particular, FIG. 1 depicts a number of domains communicating in a communication network 12, including a network domains 14, one or more enterprise domains 16, one or more partner domains 18, and a customer domain 20. The network 10 allows integration of the one or more partner domains 18 with an enterprise domain 16.

Communication network 12 can include any portion of one or more suitable networks for communicating information or data. For example, such a network can be a telecommunications network or the Internet. The Internet is an interconnection of computer "clients" and "servers" located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing. Each website or web page can be identified by a respective uniform resource locator (URL) and may be supported by documents formatted in any suitable language, such as, for example, hypertext markup language (HTML), extended markup language (XML), or standard generalized markup language (SGML). Clients may locally execute a "web browser" program. A web browser is a computer program that allows the exchange of information with the World Wide Web. Any of a variety of web browsers are available, such as NETSCAPE NAVIGATOR from Netscape Communications Corp., INTERNET EXPLORER from Microsoft Corporation, and others that allow convenient access and navigation of the Internet. Information may be communicated from a web server to a client using a suitable protocol, such as, for example, HyperText Transfer Protocol (HTTP) or File Transfer Protocol (FTP).

A telecommunications network may include telephony and voice services, including plain old telephone service (POTS), digital services, cellular service, wireless service, pager service, etc. The telecommunications network allows communication via a telecommunications line, such as an analog telephone line, a digital T1 line, a digital T3 line, or an OC3 telephony feed. The telecommunications network may include a public switched telephone network (PSTN) and/or a private system (e.g., cellular system) implemented with a number of switches, wire lines, fiber-optic cable, land-based transmission towers, spaced-based satellite transponders, etc. In one embodiment, the telecommunications network may include any other suitable communication system, such as a specialized mobile radio (SMR) system. As such, the telecommunications network may support a variety of communications, including, but not limited to, local telephony, toll (i.e., long distance), and wireless (e.g., analog cellular system, digital cellular system, Personal Communication System (PCS), Cellular Digital Packet Data (CDPD), ARDIS, RAM Mobile Data, Metricom Ricochet, paging, and Enhanced Specialized Mobile Radio (ESMR)). The telecommunications network may utilize various calling protocols (e.g., Inband, Integrated Services Digital Network (ISDN) and Signaling System No. 7 (SS7) call protocols) and other suitable protocols (e.g., Enhanced Throughput Cellular (ETC), Enhanced Cellular Control ($EC^2$), MNP10, MNP10-EC, Throughput Accelerator (TXCEL), Mobile Data Link Protocol, etc.). Transmissions over the telecommunications network may be analog or digital. Transmissions may also include one or more infrared links (e.g., IRDA).

Domains 14, 16, 18, and 20 are part of a supply chain. Each domain corresponds to a particular entity in the supply chain. These entities may include an enterprise, one or more partners who provide services or products to the enterprise, possibly an entity which maintains or operates one or more systems of the network for the enterprise and/or partners, and one or more customers of the enterprise. The enterprise may be a manufacturer of goods, such as an original equipment manufacturer (OEM), or a provider of services to businesses or consumers buying products from OEM companies, such as an electrical utility or a telecommunications company. These companies rely on efficient supply chains both for inbound materials and goods and services. A partner may be a supplier of raw materials or parts, a third party logistics (3PL) vendor such as a warehouse hub, a carrier, or a service provider, a third party maintainer (3PM) such as field service, third party repair center, third party returns handling center, or a third party fulfillment provider such as a distributor. A customer may purchase goods or services from the enterprise. Associated with each domain may be one or more functions that are performed by the respective entity. Each entity may have its own systems (e.g., computer systems) to implement some aspects of the functionality, whereas some entities may lack its own systems to implement some aspects of the functionality.

Furthermore, a network system of network 10 may be implemented at least in part at each of enterprise domain 16, partner domains 18, network domain 14, or customer domain 14 to execute the functionality of the respective domain. One or more subsystems 22 of the network system supports communication with the network domain 14 and each of the enterprise domain 16, a partner domain 18, or the customer domain 20. In a typical application, the various domains (e.g., enterprise, partner, and customer) can be implemented with heterogeneous systems, such as, for example, with different operating systems, platforms, applications, protocols, and the like (essentially, different hardware and software combinations).

The network domain 14 may be linked through a gateway to another network domain 14. For example, one network domain 14 may be associated with a service network, and another network domain 14 may be associated with an inbound or supplier network. The service network may be linked to the supplier network through the respective network domains 14 to route transactions between the networks.

An enterprise operating through the enterprise domain 16, partner domains 18, network domains 14, and customer domain 20 of network 10 manages execution of one or more tasks, processes, events, or actions (e.g., receiving orders, manufacturing products, warehousing products, delivering products, etc.) by the enterprise or its supply chain partners. In one embodiment, one or more subsystems 22 can be implemented, at least in part, with agents for providing the ability to manage some part of one or more domains. These agents may run at respective domains for managing the associated entities. Network 10 provides a framework for connecting different operating systems and sub-networks (in various domains) and communicating between them. Network 10 defines the infrastructure needed to support the management and deployment of the services for management of a supply chain. As such, network 10 facilitates the management of the supply chain by the enterprise.

Figure 2A:
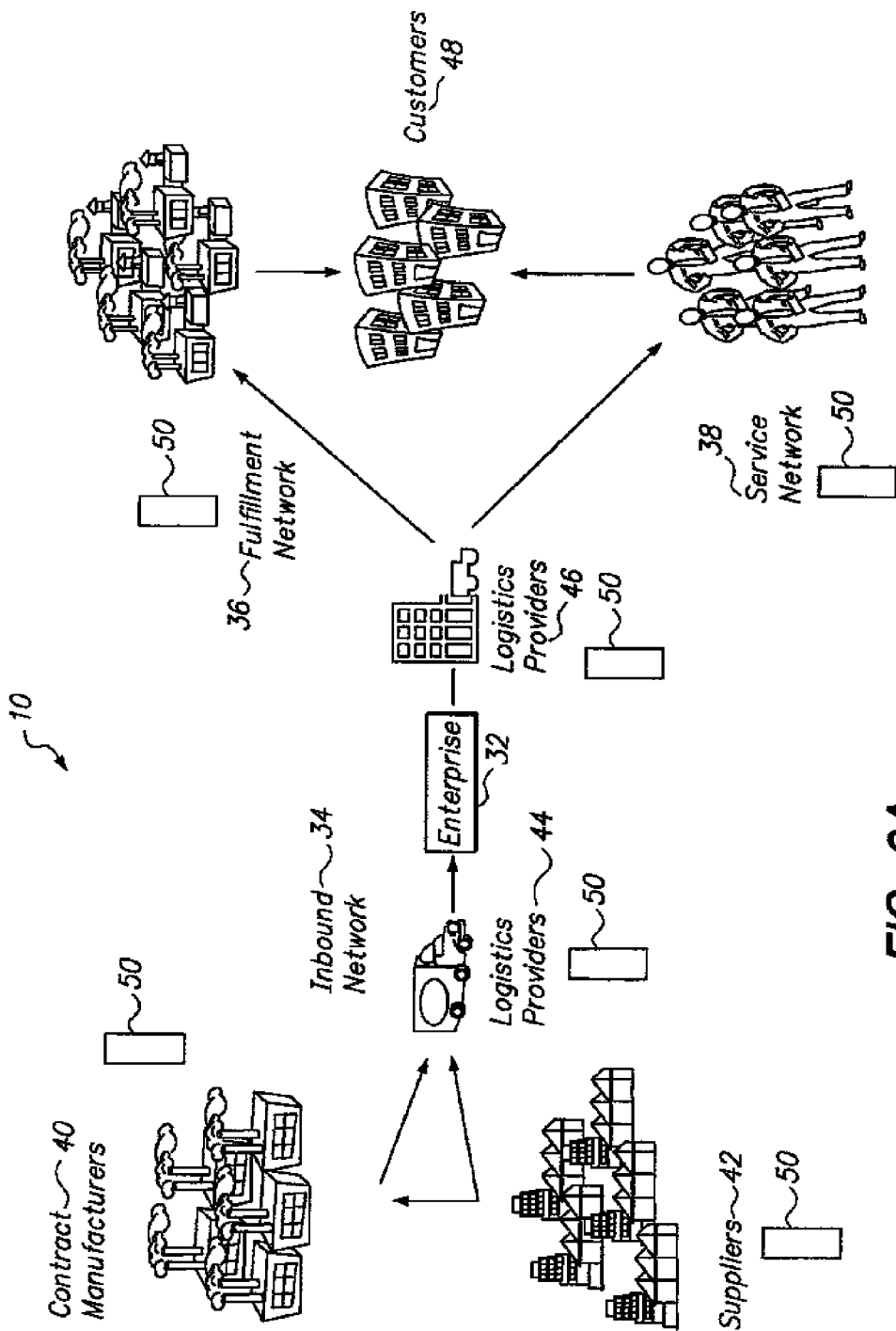
FIG. 2A illustrates a network for managing a supply chain, according to another embodiment of the present invention.

FIG. 2A illustrates a network 10 for managing a supply chain, according to another embodiment of the present invention. The supply chain may involve one or more networks, each of which involves a plurality of entities cooperating to achieve or execute related functions in one aspect of the supply chain, such as an inbound network 34, a fulfillment network 36, and a service network 38. Some entities may be involved in one network but not another network. Some entities may be involved in multiple networks.

As depicted, the inbound network 34 may involve, for example, contract manufacturers 40, suppliers 42, and logistics providers 44. Contract manufacturers 40, suppliers 42, and logistics providers 44 may cooperate to manufacture and deliver products to an enterprise 32. The contract manufacturer 40 may manufacture parts for goods manufactured by the enterprise 32. The supplier 42 may supply raw materials to contract manufacturer 40 and/or the enterprise 32. Logistics providers 44 may be needed to deliver parts, raw materials, or finished goods to the enterprise 32.

The fulfillment network 36 and the service network 38 include various entities which may cooperate with the enterprise 32 in delivering goods and services to customers 48. The fulfillment network 36 may involve, for example, call centers, contract manufacturers, logistics providers, hubs, distributors, wholesalers, or retailers who cooperate to take and fulfill orders from one or more customers. The service network 38 may include, for example, call centers, customer support, field service, repair vendors, or logistics providers who cooperate to provide services (e.g., repair, replacement, warranty, installation, etc.) for one or more customers. Logistics providers 46 may work with the fulfillment network 36 and the service network 38. Logistics providers 46 may include, for example, warehousers or delivery services.

The entities of the supply chain include the enterprise 32 and one or more partners, which can be contract manufacturers 40, suppliers 42, logistics providers 44, 46, other service providers, customers, etc. Each entity in the supply chain may have its own systems for performing at least some of the functions or tasks for which the entity is responsible. The network 10 allows integration of an existing system of the enterprise 32 with existing systems of its partners and existing systems of its end-users (e.g., customers). An existing enterprise system may be a system such as an enterprise resource planning (ERP), material requirements planning (MRP), supply chain management (SCM), customer relationship management (CRM), warehouse management systems (WMS), or enterprise application integration (EAI) application or subsystem or a legacy system with which a partner coordinator component 180 (described below) can be integrated for communication with the network 10. An existing partner system may be a system such as ERP, MRP, SCM, CRM, WMS, or EAI application or subsystem or a legacy system with which a partner coordinator component 180 (described below) can be integrated for communication with the network 10. An existing customer system may be a system such as ERP, MRP, SCM, CRM, WMS, or EAI application or subsystem or a legacy system with which a partner coordinator component 180 (described below) can be integrated for communication with the network 10. Each existing enterprise, partner, or customer system, subsystem, or legacy system may be distinct and have its own separate protocols, interfaces, processes, routines, and the like, running on respective platforms or architectures. The network system may include, for each partner, a subsystem 50, which is physically located at that partner's site. In one embodiment, the subsystems 50 of the network system logically allow integration of the diverse partner domains with the enterprise domain.

Figure 2B:
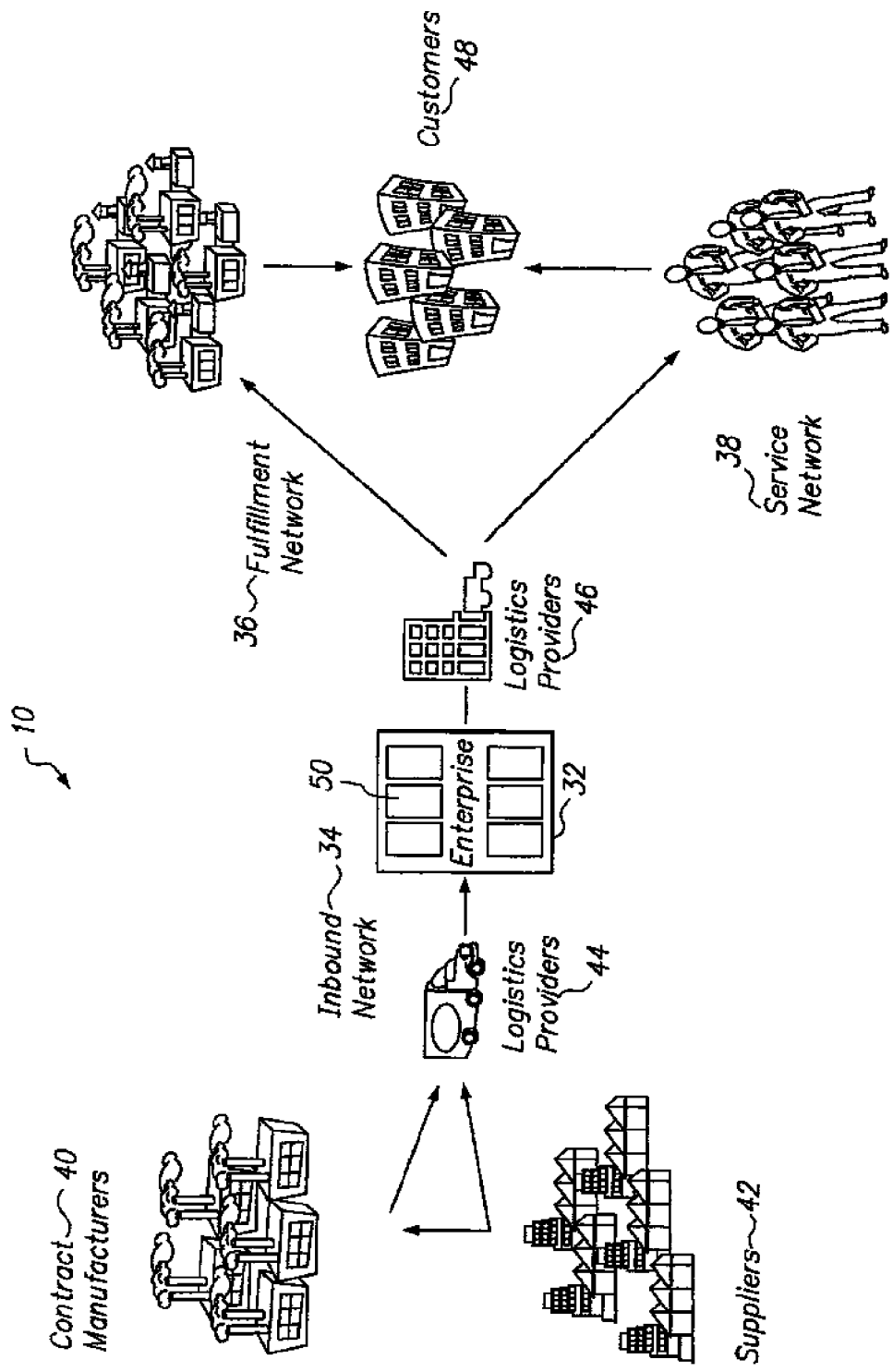
FIG. 2B illustrates a network for managing a supply chain, according to yet another embodiment of the present invention.

FIG. 2B illustrates a network 10 for managing a supply chain, according to yet another embodiment of the present invention. In this environment, like that shown in FIG. 2A, enterprise 32 cooperates with a number of partners (which may be involved in an inbound network 34, fulfillment network 36, or service network 38) to execute various functions and actions in a supply chain. Network 10 allows integration of the systems of the enterprise 32 and its partners. The network system includes a number of subsystems 50. Each subsystem 50 can reside physically at the enterprise.

Figure 3:
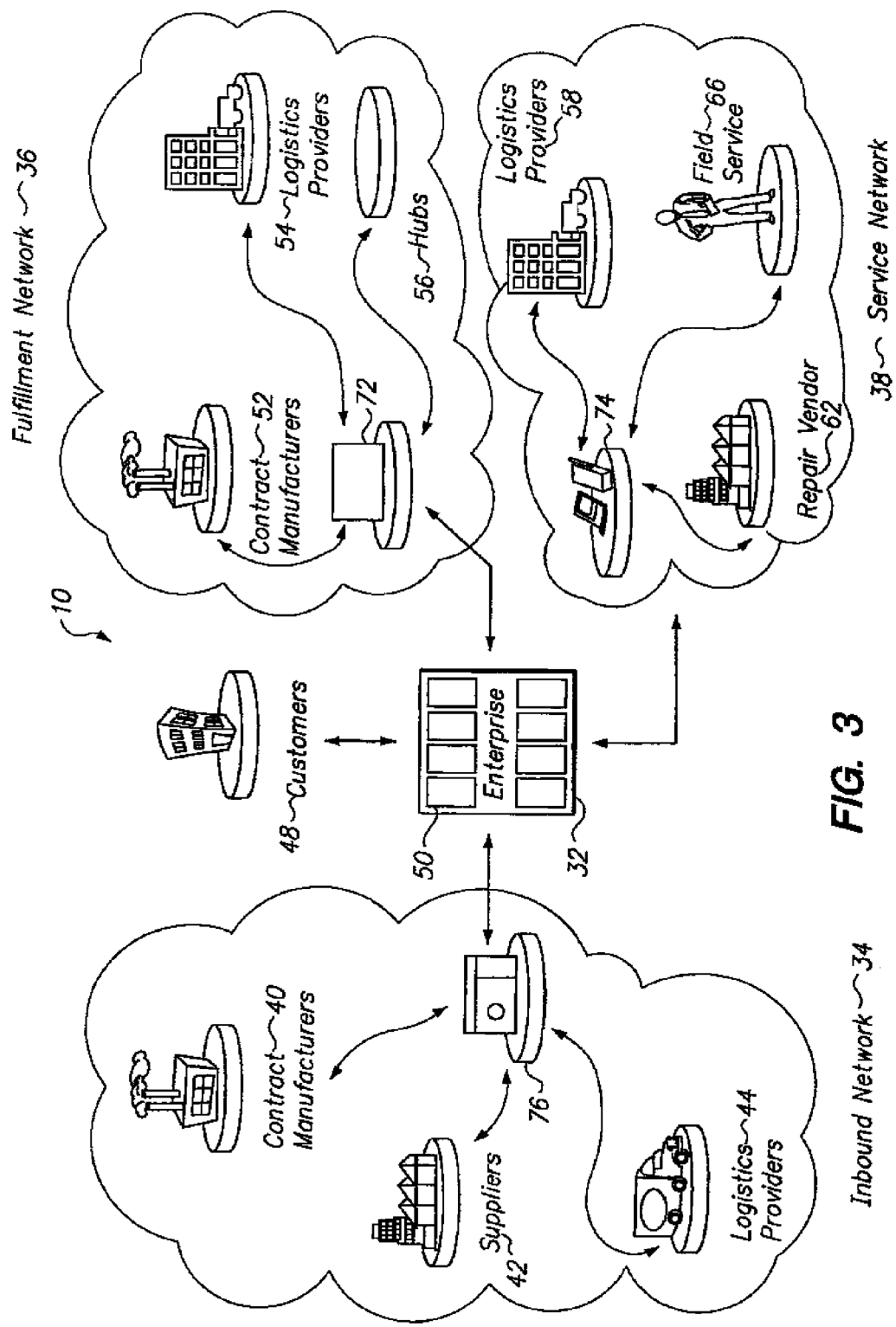
FIG. 3 illustrates a network for managing a supply chain, according to another embodiment of the present invention.

FIG. 3 illustrates a network 10 for managing a supply chain, according to an embodiment of the present invention. FIG. 3 shows that integration of partners (e.g., contract manufacturers 40, 52, suppliers 42, logistics providers 44, 54, 58, hubs 56, repair vendors 62, and field service 66) and customers 48 with the enterprise 32 is possible through a variety of different communication techniques. These different communication techniques may include a dedicated line, a telecommunications network, or the Internet. Dedicated lines may be part of a local area network (LAN) or wide area network (WAN) that connects systems such as a legacy system 72. A telecommunications network may connect any Internet Protocol (IP)-capable broadband and local-area wireless devices 74, such as cellular, mobile, pager, or personal digital assistant devices. The Internet may connect desktops and other computers through a browser 76, encrypted data communications using secure-socket level communications, or virtual private network (VPN) technology.

With regards to the various embodiments depicted in FIGS. 1-3, network 10 integrates seamlessly with an existing infrastructure of an enterprise 32, one or more partners, or a customer 48, and it is compatible with the previous information technology (IT) efforts of an enterprise 32, one or more partners, or a customer 48. The network 10 may overlay on an enterprise's existing infrastructure, thus enhancing what an enterprise has already invested in. As described herein, a framework is provided for a scalable, reliable, flexible network by defining standard ways of network-management in a supply chain and for achieving interconnectivity across potentially heterogeneous systems and sub-networks. Network 10 is thus able to manage diverse equipment and software associated or located at different domains throughout the supply chain, thus providing a view of a significant portion of the network infrastructure for the supply chain (from end to end). Ultimately, this enables the accurate measurement of statistics for overall supply chain performance.

In one embodiment, the network 10 can be constructed primarily in Java applications and may be supported by industry-standard technologies such as browsers, Web servers, Enterprise Java Beans (EJB)-based transaction servers, and relational database management systems (RDBMSs). The network 10 may have a Java 2 Platform, Enterprise Edition (J2EE) web infrastructure, providing the ability for customized portal access and wireless technology. The J2EE framework provides a coherent model for applications development and deployment, unlike the hybrid models in the client/server world, which have evolved into a complex layer of unrelated technologies. J2EE also provides support for the client/server interfaces to make it easy to co-exist with Microsoft-based ecosystems. The network 10 can fully exploit the advanced features of J2EE, such as network directories for security and business policies, component-based architecture for networked business components, and Java Messaging Services to loosely couple a network of applications residing on different processors and networks. The value of J2EE is providing a networked infrastructure with configuration flexibility.

The network 10 can be built as a grid to allow multiple dynamic routing policies and events to travel at different cycles of execution between redundant processors, which may reside at the enterprise domain 16 and the network domain 14. The network 10 allows multiple dynamic routing policies—each entity can coordinate and propagate decisions in real time without disrupting the integrity of the enterprise-focused system and data repositories of other supply chain entities. The network 10 is secure, reliable, scalable, and customizable to support the individual needs of a business partnership between the enterprise and a partner. This partnership is embodied in the form of a contractual agreement with a clear definition of a business process, business policy rules, and service-level agreements, ensuring support of an enterprise's mission-critical business processes. This customization model is different from enterprise applications, which are designed to support one centralized, static, standardized business process and business policy rules. With the network's 10 dynamic framework for managing routing and other forms of business policies and events, an enterprise can build intelligence into its supply chain network 10 to manage each partner's operation as an extended enterprise business unit (EBU). The agreement between the enterprise and the EBU becomes the governance mechanism to enforce business policies and monitor contract compliance for service level agreements. The business processes are policy-driven. This allows an enterprise to benefit from automated governance of the extended supply chain.

In one embodiment, to implement the network 10, an integrated network application suite may be designed and architected as a complete closed-loop system. This application suite may incorporate all of the features in one package required to execute and coordinate transactions accurately in the network 10 and be able to monitor the performance of any given partner. It may function as the "Traffic Cop" or "Air Traffic Controller" for a dynamic network. The application suite can sit transparently on top of existing IT infrastructures, rather than replace applications.

The network 10 allows for a non-intrusive business-to-business (B2B) integration. The network 10 offers partners multiple connection options to minimize IT investment, reduce overhead, and increase adoption rates among partners. The noninvasive system components do not replace the infrastructure of an enterprise or a network, but instead integrate seamlessly with and enhance the existing infrastructure of an enterprise or a partner. The network 10 can support direct, real-time connections to a number of enterprise resource planning (ERP), material requirements planning (MRP), supply chain management (SCM), customer relationship management (CRM), warehouse management systems (WMS), and enterprise application integration (EAT) applications or subsystems for direct back-end system integration. Furthermore, the network can support connections to databases, spreadsheets, and other software systems used to manage supply chain operations. Communication with any existing system is possible using multiple electronic connection protocols, including enterprise application integration (EAT), electronic data interchange (EDI) files, flat files, and application connectors. Because the network 10 does not require users to install and run software from their systems, even companies with limited IT capabilities can use the network 10 through an electronic connection protocol or a browser with access to personalized web functions. The network 10 can leverage existing connectivity with EAI, database, direct VPN, existing EDI standards, and leading XML-based industry standards, including ebXML and RosettaNet.

The network can provide a standards-based interchange that supports a variety of data transmission formats and provides translation services between the various standards. Using the network 10, any number of trading partners, using any number of standard data formats—e.g., ANSI X.12 and EDIFACT, SAP IDOC, RosettaNet, XML, and custom flat files—can automatically share data between systems. With minimal change to their existing systems, trading partners can eliminate the need for time-consuming and error-prone manual processes.

For entities that do not need or which cannot support integration with back-end systems, the network 10 can provide immediate access to these services via the Internet. Using a web browser, for example, partners can access the network's services to view and communicate with other entities in the supply chain. With the network 10, an entity can immediately participate in the supply chain community and get value from the network 10, implementing deeper back-end systems as the entity's requirements or abilities evolve.

Allowing for separation of partners, the network 10 lends itself to no single point of failure. This ensures rapid deployment, while still allowing a high degree of personalization. The network 10 provides an error-free, highly secure, mission-critical, and always-on solution to an enterprise and its partners.

The network 10 provides consolidated data repositories. Transactional, reference, and configuration data can be stored in a relational database or a lightweight directory access protocol (LDAP) repository, allowing data accuracy beyond data exchange and manual reconciliation. The business repository can act as a proxy for the enterprise or partner applications within the network.

Data can be shared in real-time, thus providing up-to-date information or data that allows better management over events, actions, or transactions in a supply chain. The present invention provides real-time visibility and control of data content and the business processes from end to end. The network 10 enables an enterprise and its partners to view accurate supply chain information in real-time. The network 10 can provide total visibility into the conglomeration of enterprise-class and legacy systems within a supply chain. Because contract manufacturers, suppliers, and third party logistics (3PLs) all rely on shared data, synchronization, validation, and enrichment are desirable.

The network 10 can provide real-time monitoring that alerts an entity when the reality of events or conditions in the supply chain deviates from an entity's plan or business process. It allows an entity to assess the impact of exception conditions, effect their resolution, and ensure that the entity's resolution decisions propagate throughout the supply chain due to the business context management provided by the network 10.

The network 10 can provide transactional processing for monitoring, reporting, and alerting. The business context of all transactions is maintained in the network repository and process state managers to be used for real-time validation of the content of transactions to ensure high degrees of execution accuracy. A business context provides a complete view into a supply chain. Such business context may comprise information and data for the transaction, such as, for example, the type of transaction (e.g., purchase order, service request, installation request, warranty matter, replacement request, etc.); the names, addresses, and contact information of the partners involved in the transaction; the name, address, and contact for an end-user (e.g., consumer) which initiated the transaction; the purchase/service request order number for the transaction; the date on which the transaction was initiated; the dates on which the partners involved in the transaction was notified; the dates on which the involved partners completed tasks related to the transaction (e.g., shipped product, made service call to end-user's location, completed installation of new product, etc.); and the like. For example, a purchase order line item is matched against supplier shipment records and warehouse receipts in real-time, rather than post-transaction matching of transactions to verify accuracy. Thus, a perpetual view of inventory is maintained across the entire supply chain, reducing expedite fees, while increasing service levels due to increased accuracy of data and process execution. Lost sales due to inability to deliver are reduced, service levels are increased, and inventory and expedite fees are decreased.

The network 10 supports real-time reporting of status, events, or conditions in a supply chain. The network 10 can provide business metrics and trend analysis, such as real-time metrics and reporting request confirmation, part ship, inventory, WIP, part delivered, and cancellation. A user can view historical supply chain metric data with drill-down capabilities. Pre-configured business metrics, such as reports, graphics, and alerts based on process exceptions, can be available in real time. Personalized, real-time alerts can be delivered any-where, such as to a graphical user interface, a pager, a phone, or e-mail. The improved visibility leads to lower costs and maximized service levels.

The network 10 can provide a uniform business context across an enterprise and partners. The network 10 can maintain the context of complex multi-company transactions for catching errors at the source, thus minimizing post-processing of data to match and reconcile transactions. This allows business users a consistent view of relevant supply chain information, whether the information originated in an enterprise application or a partner application. Reconciliation and matching can be provided in real-time, as opposed to batch post-processing, saving significant process cycle time.

The network 10 can be based on a distributed and layered architecture, rather than a client or server model. The layered architecture enables better fault tolerance and isolation, as each layer is built with a full set of error compensation and diagnostics capabilities. Each functional layer can also be optimized for performance and scalability, thereby eliminating system bottlenecks and enabling more robust load balancing schemes. The network 10 is designed to have full horizontal and vertical scalability across any layer with no single point of failure.

Supply Chain

Figure 4:
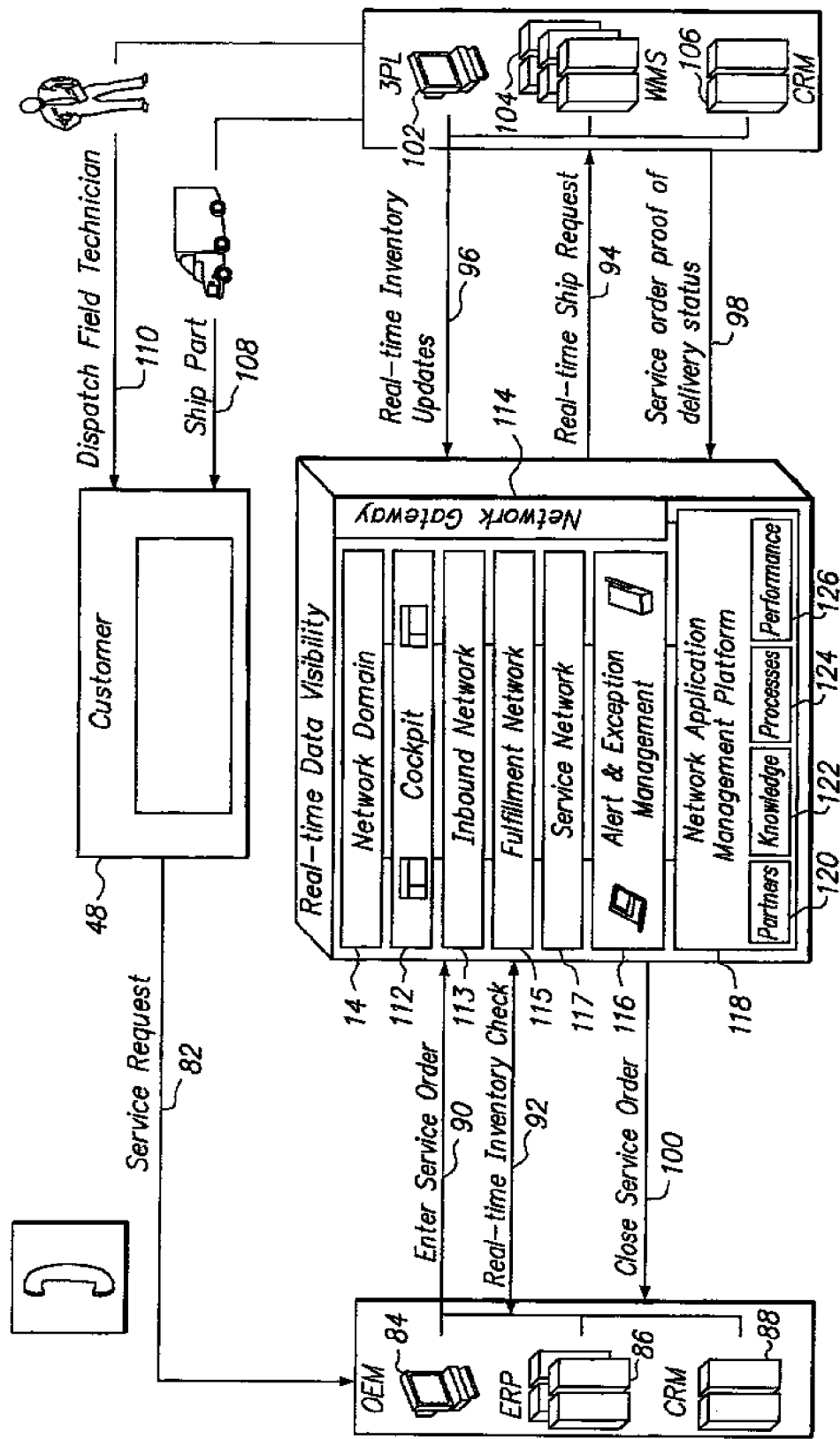
FIG. 4 illustrates a number of different actions which may occur in a supply chain and some features of a network domain, according to an embodiment of the present invention.

FIG. 4 illustrates a number of different actions which may occur in a supply chain and some features of a network domain 14, according to an embodiment of the present invention. A customer 48 may make a service request 82 to an OEM 84 which can be an enterprise 32. The OEM 84 may enter a service order 90 to a network domain 14. One or more real-time inventory checks 92 may occur between the network domain 14 and the OEM 84. The network domain 14 may make a real-time ship request 94 to a third party logistics (3PL) provider 102, which can be a partner to OEM 84. The 3PL 102 may provide real-time inventory updates 96. The 3PL may ship a part 108 or dispatch a field technician 110 to the customer 48. When the service order is complete, the 3PL may provide service order proof of delivery status 98 to the network domain 14, and the network domain 14 may close the service order 100 with the OEM 84.

The checks, orders, updates, requests, etc. that are provided or exchanged in the supply chain can be conveyed in the form of transaction messages for notifying, updating, alerting, or otherwise informing various entities of the status of transactions, tasks, events, or other actions in the supply chain. At least some of the transaction messages can be associated with workflows that are initiated or triggered, for example, by the order of a product or a request for service. The transactions, tasks, events, or other actions in the supply chain can be governed by or performed pursuant to contracts or agreements between two or more entities (e.g., an enterprise and one or more partners, such as an extended enterprise business unit) involved in the supply chain. These contracts or agreements may include terms which specify time-based service levels, expectations, obligations, or business policies, which must be met by the different entities.

The OEM 84 may operate or maintain a system which includes applications or subsystems for enterprise resource planning (ERP) 86 and customer relationship management (CRM) 88. The ERP application 86 may provide or support functionality that is related to a core competency of the OEM 84, such as, for example, the manufacturing of a particular article or product. The customer resource management application 88 may support or maintain a database with information for one or more customers 48 of the OEM 84. The 3PL provider 102 may operate or maintain a system which includes applications or subsystems for a warehouse management system (WMS) 104 and a CRM 106. The WMS application 104 supports inventory management and other functionality associated with storing products in a warehouse. Each of OEM 84 and 3PL provider 102 may have a respective domain in the supply chain.

The OEM 84, the 3PL provider 102, or any other partner in a supply chain may maintain real-time data related to the supply chain. This real-time data may include reference data and transaction data. Reference data can specify, for example, inventory levels and parts numbers. Transaction data can specify, for example, numbers for purchase orders, shipping receipts, invoices for various transactions in which the respective partner is involved; the dates and times at which the partners were notified, alerted, or requested to take actions or work on tasks; the kinds of tasks, actions, and the like required to be performed by the partners (e.g., pulling a product from inventory, packaging a product, delivering a product, making a service call to a customer, installing a machine at a customer site, repairing a machine, etc.); the dates and times at which the actions or tasks were completed; and the like.

Each of the ERP 86, CRM 88, WMS 104, and CRM 106 of the OEM 84 or 3PL can be existing partner systems into which systems of the present invention can be integrated. These existing partner systems can be information technology infrastructure for the respective partners. At least some portion of the existing partner systems can be legacy systems. In one embodiment, systems of the present invention may provide the real-time data maintained at the existing partner systems to the network domain 14.

The network domain 14 may use the real-time data from the existing partner systems to coordinate, initiate, or otherwise manage actions and events associated with the supply chain. As depicted, the network domain 14 may include applications or subsystems for a graphical user interface (GUI) 112 (labeled "cockpit"), a network domain gateway 114, an inbound network component 113, a fulfillment network component 115, a service network component 117, an alert and exception management component 116, and a network application management platform 118. The network domain gateway 114 may facilitate communication between the network domain 14 and one or more partner domains 18, enterprise domains 16, or customer domains 20. The graphical user interface 112 may be a graphical interface that allows an user to access and interact with the network domain 14. The inbound network component 113, fulfillment network component 115, and service network component 117 may be dedicated application layers that may support communication or interactions with inbound network 34, fulfillment network 36, and service network 38, as shown in FIGS. 2A, 2B, and 3.

The network application management platform 118 in network domain 14 may comprise or support databases or subsystems, such as a partners subsystem 120, a knowledge subsystem 122, a processes subsystem 124, and a performance subsystem 126. The partners subsystem 120 may provide or maintain information on the various partners involved in the supply chain. The knowledge management subsystem 122 may provide fault determination and root cause analysis at the application level. The processes subsystem 124 manages the state of business processes governing the flow of business objects relating to transactions, events, or actions which occur in the supply chain. These objects may be generated by an enterprise application, by third-party systems, or by the network domain 14. The processes subsystem 124 may also provide enforcement of the policies and procedures for the enterprise and one or more of its partners. This allows automated inter-enterprise communication and collaboration in real time. The performance management subsystem 126 may provide the ability to monitor the system performance statistics for each partner in the network domain 14.

The alert and exception management component 116 manages alert- and exception-related actions, which may occur within the supply chain. The alert and exception management component 116 may provide sophisticated alert handling, exception management, and event management capabilities. Alerts may relate to actions and trigger conditions, such as order volumes exceeding a specified amount, maximum time allowed for an activity being reached, or a service level agreement (SLA) being violated. Alerts are classified by severity according to specific business process and/or product control thresholds. The enterprise or partner can define which entity receives an alert based on the alert name, alert severity, and alert context. Notifications are transmitted via wireless application protocol (WAP), email, or pager. Escalation processes and specific message text can also be customized to meet the specific needs of the enterprise or the partner.

The functionality of various components of network domain 14 can be performed with suitable data processing facility running appropriate software and operating under the control of any suitable operating system, such as MS-DOS, MacINTOSH OS, WINDOWS NT, WINDOWS 2000, OS/2, UNIX, XENIX, GEOS, and the like.

The subsystems 120, 122, 124, and 126 can be implemented with any one or more suitable storage media, such as random access memory (RAM), read-only memory (ROM), disk drives, tape storage, or other suitable volatile and/or non-volatile data storage facility.

Network Domain

Figure 5:
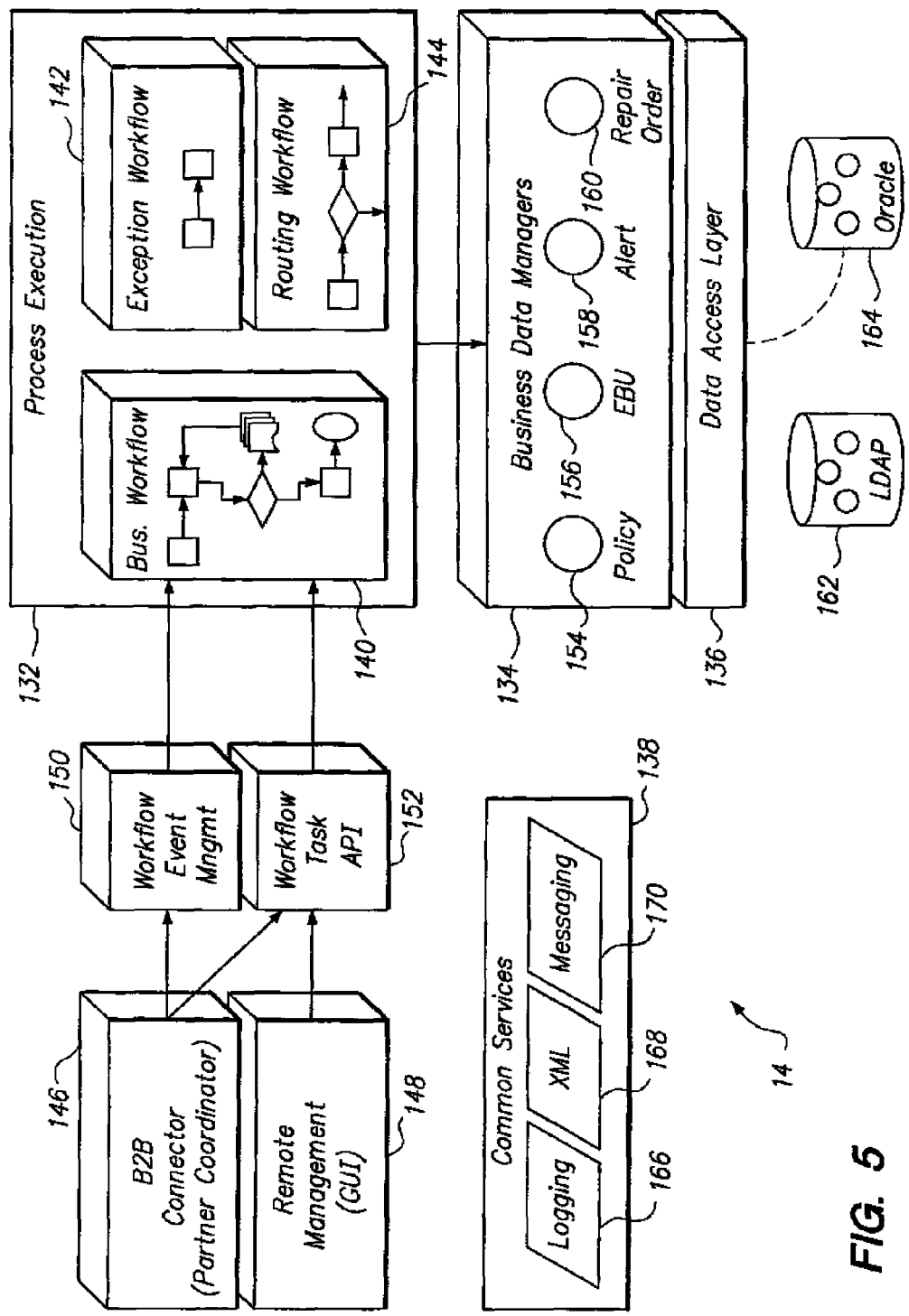
FIG. 5 illustrates components of a network domain, according to an embodiment of the present invention.

FIG. 5 illustrates components of a network domain 14, according to an embodiment of the present invention. As depicted, network domain 14 comprises a process execution component 132, a business data managers (BDM) component 134, a data access layer component 136, and a common services component 138. One or more transaction messages may enter the network domain 14 via a business-to-business (B2B) connector 146, such as a partner coordinator, alone or in combination with a remote management component 148, such as a web-browser graphical user interface (GUI). A workflow event management component 150 or a workflow task API (application programming interface) component 152 may route the transaction messages based on the point of origin found in the transaction message header to the appropriate process execution component 132. The API component 152 and the event manager component 150 provide an interface for external activities to connect to and use the workflow (s) that are driven by the process execution component 132. They may also provide an interface for receiving a request for a transaction from an end-user (e.g., customer) or a partner.

The functionality of business data manager component 134, data access layer component 136, process execution component 132, common services component 138, workflow event management component 150, and workflow task API 152 can be performed by any suitable processor such as a main-frame, file server, workstation, or other suitable data processing facility running appropriate software and operating under the control of any suitable operating system, such as MS-DOS, MacINTOSH OS, WINDOWS NT, WINDOWS 2000, OS/2, UNIX, XENIX, GEOS, and the like.

The process execution component 132 is designed to execute objects representing decision nodes, events, and actions (e.g., tasks). The process execution component 132 may include software or applications for business workflow 140, exception workflow 142, and routing workflow 144. A workflow may be initiated by a transaction, a request, or a demand and may include processes, which execute tasks. The workflows 140, 142, and 142 may access real-time data relevant to a transaction from an existing partner system, generate a context for the transaction using the real-time data, and process a request for a transaction in the context for the transaction. In one embodiment, a context may be generated and maintained by using a particular item or set of information, such as, for example, a purchase order number, to identify, gather, forward, access, and process data and initiate and direct tasks and actions for the transaction. The business workflow 140 manages business policies and transactions in network domain 14. The exception workflow 142 monitors and manages alerts. The routing workflow 144 routes transaction messages throughout the network domain 14, as well as to and from other domains (e.g., partner domains 18, enterprise domain 16). Each of workflow 140, 142, and 144 may include triggers which call on specific common services component 138 and business data managers component 134.

The business data managers component 134 may manage the processes involving one or more objects which are initiated pursuant to the transaction messages that flow through network domain 14 and other domains. As depicted, the business data managers component 134 may include a policy manager component 154, a enterprise business unit (EBU) manager component 156 (representing a business organization unit), an alert manager component 158, and a repair order manager component 160. The policy manager component 154 maintains the policies and practices specific to an enterprise's way of doing business with a partner, such as an extended EBU. The policy manager component 154 may be "called" by the business data manager component 134 to ensure that a workflow does not violate any organizational conditions of one or more entities in the supply chain (e.g., enterprise, partner, etc.). The alert manager component 158 may provide or support alert handling, exception management, and event management capabilities for the actions take (or not taken) by the various entities pursuant to the transaction messages. The repair order manager component 160 provides or supports the management of events or transaction messages related to the orders for repair of products provided by the enterprise and/or its partners.

The data access layer component 136 provides access for other components of the network domain 14 to databases, such as a lightweight directory access protocol (LDAP) database 162 or a relational database (labeled "Oracle" in FIG. 5) 164. The databases may store real-time data relating to one or more transactions and may maintain a respective context for each transaction. The use of the LDAP 162 provides for the distribution of key information throughout the network 10 for access by network system components. Business policy rules can be implemented in a LDAP database 162 or a relational database 164 to allow for separation of decision logic from process logic. This mechanism also allows for dynamic reconfiguration of business policy rules with distribution throughout the network 10. The business logic in the network 10 dynamically loads policy rules through the use of a policy manager component 154.

LDAP database 162 and relational database 164 can be implemented with any one or more suitable storage media, such as random access memory (RAM), read-only memory (ROM), disk drives, tape storage, or other suitable volatile and/or non-volatile data storage facility. LDAP database 162 may be configured as a relational database.

The common services component 138 administers or manages areas, such as security, directory, auditing, alert notification, logging 166, eXtensible Markup Language (XML)

converting 168, and messaging 170, which can be commonly performed for various transactions. Logging 166 facilitates the auditing of data. XML converting 168 converts or formats messages into XML. Messaging 170 provides secure messaging between components. Security provides authentication, non-repudiation, authorization, and confidentiality services. Directory provides a data flow for platform configuration data and parameters. Alerts provide warnings and errors encountered by the network domain 14 and/or other domains involved with the supply chain.

Business Processes

Figure 6:
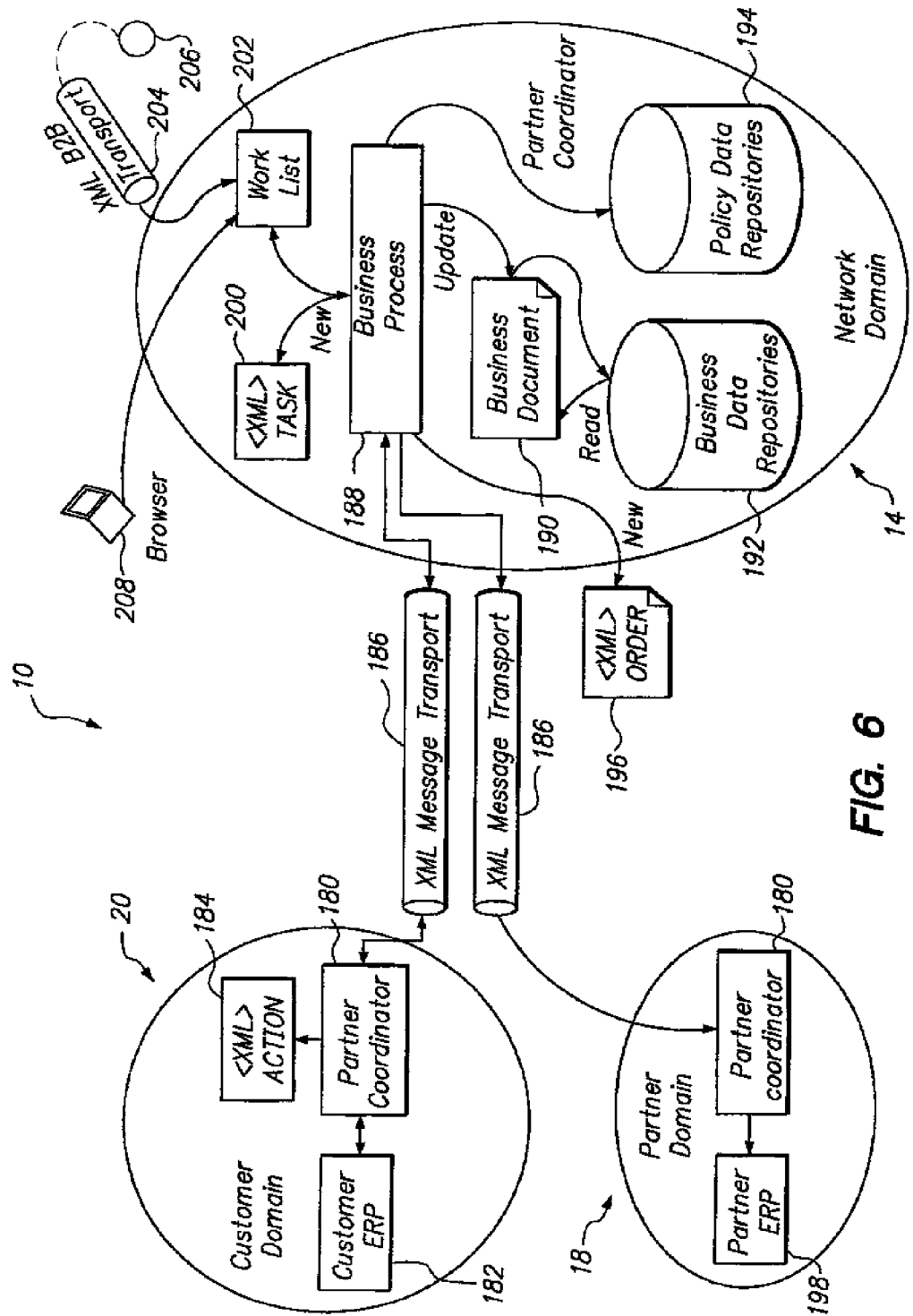
FIG. 6 illustrates the communication among and within various domains of a network for managing a supply chain, according to an embodiment of the present invention.

FIG. 6 illustrates the communication among and within various domains of a network 10 for managing a supply chain, according to an embodiment of the present invention. This communication may occur pursuant to one or more business processes executing throughout the supply chain. For each such process, object-oriented software in the network may perform one or more specified functions on data.

Data relating to numerous business events may get exchanged between the customer domain 20, network domain 14, and a partner domain 18. In one embodiment, for this purpose, one or more partner coordinator components 180 may be provided at customer domain 20, partner domain 18, or network domain 14. A partner coordinator component 180 may physically reside in the customer domain 20 or partner domain 18, as shown in FIG. 6, or in the network domain 14. In some embodiments, the partner coordinator component 180 provides the network domain 14 with real-time information about transactions that are occurring within the supply chain. This real-time information can be used to generate, assemble, modify, update, etc., respective contexts for the transactions. The partner coordinator may independently "push" out the real-time data to the network domain 14 or may provide access to the data for the network domain by cooperating with one or more existing (or legacy systems) at the customer domain 20 or partner domain 18.

In many instances, the business events in a supply chain can take place at any given time depending on the rules and conditions derived from a business process. The description for FIG. 6, however, is scenario-based and provides two examples that will illustrate how a transaction might flow through the network 10. The following examples are presented solely for the purpose of further illustrating and disclosing the present invention, and are not to be construed as limiting the invention. These examples assume content-based gateway routing and, for clarity, are simplified. Transactions for administrative purposes, such as message acknowledgement and error logging, are not described in detail.

In the first example, which may involved B2B messaging, a business request may be created from an application in a customer enterprise resource planning (ERP) application or system 182. This request can be, for example, an order by the customer for a replacement part or a service repair. The request may be transformed into an eXtensible Markup Language (XML) document 184 by a partner coordinator component 180 and may be transported to the network domain 14 as a message by an XML message transport 186. The partner coordinator component 180 may handle data, translate messages, and execute processes. The partner coordinator component 180 provides or supports a standard means or way for communicating with network domain 14, thereby allowing distributed processing to appropriate levels for optimum performance, reusability, and efficiency.

At the network domain 14, the message is passed to a business process 188, for example, according to the type of message. The business process 188 may be part of or running on an execution subsystem 238 (described below). The message may relate to an existing process (e.g., a follow-up to a product order previously placed by the customer), or may cause initiation of a new process (e.g., a new order for a product or service). In either case, the process may operate in a context for the transaction.

In response to the incoming message, business process 188 may access real-time data by reading related business data from a business document 190 in the business data repositories 192. The business data repositories 192 maintain order and inventory information along with metadata information for the network 10. The repositories 192 may contain, for example, configuration data, metadata for private applications in the network, cross-reference key information for quick lookup, table-driven business policy rules, object-relational message maps, private network application schema and extensions. The metadata repository can be tightly integrated with an LDAP. Some lookup functions will be LDAP-based with detailed data in the repository. Business process 188 may evaluate conditions and determine subsequent actions through the use of policies stored in the policy data repositories 194. Business process 188 can then update business data in the business document 190, and generate audit and process metrics.

The business data repositories 192 and the policy data repositories 194 can be implemented with any one or more suitable storage media, such as random access memory (RAM), read-only memory (ROM), disk drives, tape storage, or other suitable volatile and/or non-volatile data storage facility. The business data repositories 192 and the policy data repositories 194 may be configured as one or more relational databases.

If a response to the customer is required, a new XML document can be created at network domain 14 and transported back to the customer ERP application or system 182 in the customer domain 20.

Additionally, network domain 14 may send a response to a partner domain 18 as well. In some instances, there will be times when the network 10 may instantiate a business process based on the rules defined by the service level agreement (SLA) contract between a customer, the enterprise, and/or one or more partners. Thus, if the partner is late on providing predefined parts or services, a notice-of-warning 196 would be generated. The notice 196 can be created in or converted to an XML document, transported to the appropriate partner domain 18 by the XML message transport 186, translated by the partner coordinator component 180 from XML into a format capable of being read by a partner ERP application or system 198, and routed to the proper destination, either within the partner domain 18 or some other domain.

In the second example, based on user-defined rules, a scheduled task 200 (formatted in an XML document) may be generated by the network domain 14. The task may be posted to a work list table 202 for handling by a user.

When a user signs-on to the network domain 14, an alert may be presented, for example, via a suitable GUI (e.g., GUI 112 of FIG. 4), thereby signaling the user that there is a task 200 that requires completion. The user may access the work list table 202, identify the task 200, and complete the task 200.

Alternatively, the same task 200 could be retrieved by a user via an ERP application or system 206 located on a partner domain 18. The task 200, formatted in an XML document, can be transported to the partner coordinator component 180 on the partner domain 180 via XML transport 204, translated and processes by the ERP application or system 206.

On completion of the task 200, a new XML document specifying the action taken for the task may be returned to the business process 188, which will update the context for the transaction, for example, by updating business data repositories 192, and thereafter continue with further activities.

Subsystems

Figure 7:
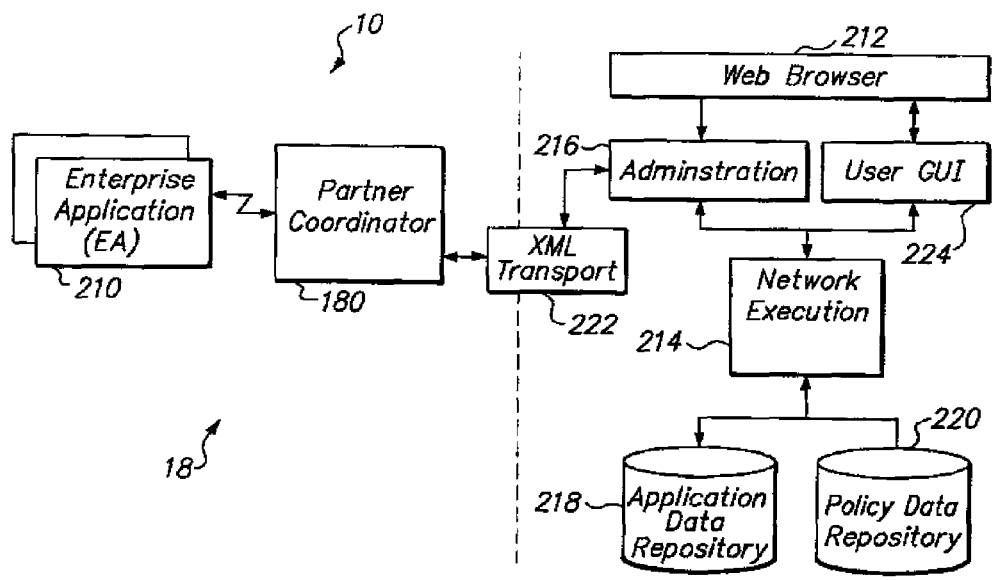
FIG. 7 illustrates components of a network for managing a supply chain, according to an embodiment of the present invention.

FIG. 7 illustrates components of a network 10 for managing a supply chain, according to an embodiment of the present invention. In this embodiment, an enterprise application (EA) 210 (also referred to as an enterprise resource planning (ERP) application or system) and a partner coordinator component 180 are provided in a partner domain 18 of the network 10. A web browser 212, user GUI 224, administration component 216, network execution component 214, application data repository 218, policy data repository 220, and XML transport component 222 are provided in a network domain.

The functionality of enterprise application 210, partner coordinator component 180, XML transport 222, web browser 212, administration component 216, user GUI 224, network execution component 214, application data repository 218, and policy data repository 220 can be performed by any suitable processor such as a main-frame, file server, workstation, or other suitable data processing facility running appropriate software and operating under the control of any suitable operating system, such as MS-DOS, MacINTOSH OS, WINDOWS NT, WINDOWS 2000, OS/2, UNIX, XENIX, GEOS, and the like and connected to suitable storage facility.

This diagram illustrates the exchanges and management of data between the components of the network 10. The network 10 can receive and provide supply chain data at either the enterprise application (EA) 210 or from the web browser 212. The partner coordinator component 180 may manage data integration to an EA 210 (also referred to as an Enterprise Resource Planning (ERP) application or system). Data may also be sent from a web browser 212 into the network system 10. The network execution component 214 may be responsible for receipt of data (from either an EA 210 or web browser 212) and the management of metrics harnessed from that data for review by a user.

The network system 10 may include a partner coordinator component 180, network execution component 214, and administration component 216. The partner coordinator component 180, network execution component 214 and administration component 216 can all be considered subsystems. A subsystem is a cohesive functional package of hardware or software applications that provides behavior, for example, through interfaces. Application properties may be easily administered from within a single file (which can be formatted in LDAP or Java Native Directory Interface (JNDI)). An application can be configured from an external configuration file. For example, system properties may exist in a centralized repository, such as application data repositories 218 or policy data repositories 220. This eliminates the need to search through code to find specific information. Extensible database integration can be provided so that any Java Database Connectivity (JDBC) compliant database can be integrated with the network system 10 for the B2B model. Applications may run within a J2EE (Java 2 Platform, Enterprise Edition) compliant application server that supports EJB (Enterprise Java Beans) 2.0 or above. In one embodiment, the deployed software may comprise a collection of Java Archive (JAR), WAR, and ZIP files. WAR is J2EE archive of web resources—jsps, servlets, html, and images.

The partner coordinator component 180 may adapt to the partner's (or enterprise's) system, transform customer data to proprietary format, initiate business-to-business messaging transportation. The partner coordinator component 180 may generate, route, and receive messages that are exchanged with the network domain 14. The partner coordinator component 180 may format messages into XML format. The partner coordinator component 180 may be part of a connection subsystem 228 (described below). As depicted, the partner coordinator component 180 is shown as physically residing in the partner domain 18, but it could also physically reside in the network domain 14.

The network execution component 214 may administer one or more transactions of the supply chain. For example, the network execution component 214 may be responsible for the business processes and business rules that govern how processes for handling the transactions take place in the supply chain. The network execution component 214 may also be referred to as an execution subsystem 238. In this embodiment, the network execution component 214 is shown as physically residing in the network domain 14, but it could also physically reside in the enterprise domain 16 or the partner domain 18.

Administration component 216 is responsible for the administrative-related processes of the system. Administration component 216 may be responsible for setting up enterprise business units (EBUs), associating relationships, and user entitlement. In addition, administration component 216 may provide security, messaging, directory, logging and alerts services through a common services component.

XML transport component 222 cooperates with partner coordinator component 180 for the exchange of messages between the network domain 14 and other domains (e.g., partner domain 18, enterprise domain 16).

The application data repository 218 may store data that supports the subsystems of the network domain 14 or the enterprise domain 16. The data may be segregated into logically consistent areas that usually correspond to business functions. In this manner, the data can be understood and structured within the scope of respective business functions. For those relationships that transcend a business function, data from other subject areas are "borrowed" to demonstrate the relationship.

The policy data repository 220 may identify business policies (rules) that govern how to distribute, perform, deliver, or initiate work, transactions, events, actions, etc. (e.g., repair orders) to specific entities (e.g., enterprise business unit (EBU)) from among many potential entities. A policy may be implemented by many rules. There may be many conditions that invoke a rule, and a rule may trigger one or more actions, carried out by an entity. An action may result in one or more state transitions within a business process.

There may be policies that govern how (e.g., protocols) the work is communicated to the Enterprise Business Unit (EBU) or other entity of choice. This may require knowing the format used or capable of being handled by the EBU, such as, for example, eXtensible Markup Language (XML) or File Transfer Protocol (FTP). In addition, policies may govern the relationship between specific transactions. This may be used to manage an iteration of the business process and determine the alerts that are generated when the process violates one or more policies. For instance, if a partner which specializes in repair attempts to replace an item, but a policy prohibits replacing items that are out of warranty, the policy statement can be stored in this subject area. Another example is a relationship policy. A relationship between two entities may require many relationship policies.

The application data repository 218 and the policy data repository 220 can be implemented with any one or more suitable storage media, such as random access memory (RAM), read-only memory (ROM), disk drives, tape storage, or other suitable volatile and/or non-volatile data storage facility. The application data repository 218 and the policy data repository 220 may be configured as relational databases.

Figure 8:
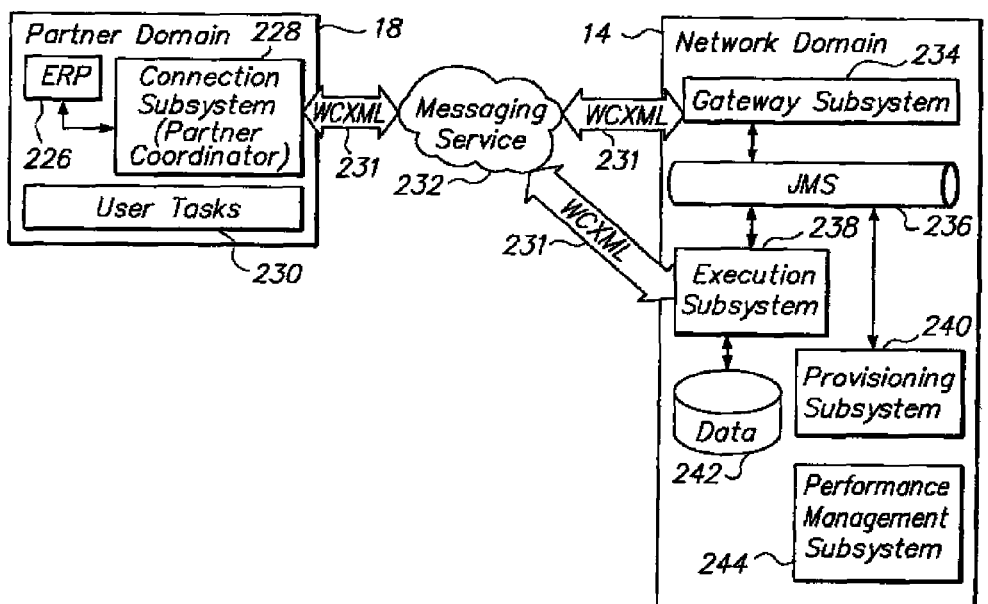
FIG. 8 illustrates a scenario for a business-to-business transaction, according to an embodiment of the present invention.
Figure 9:
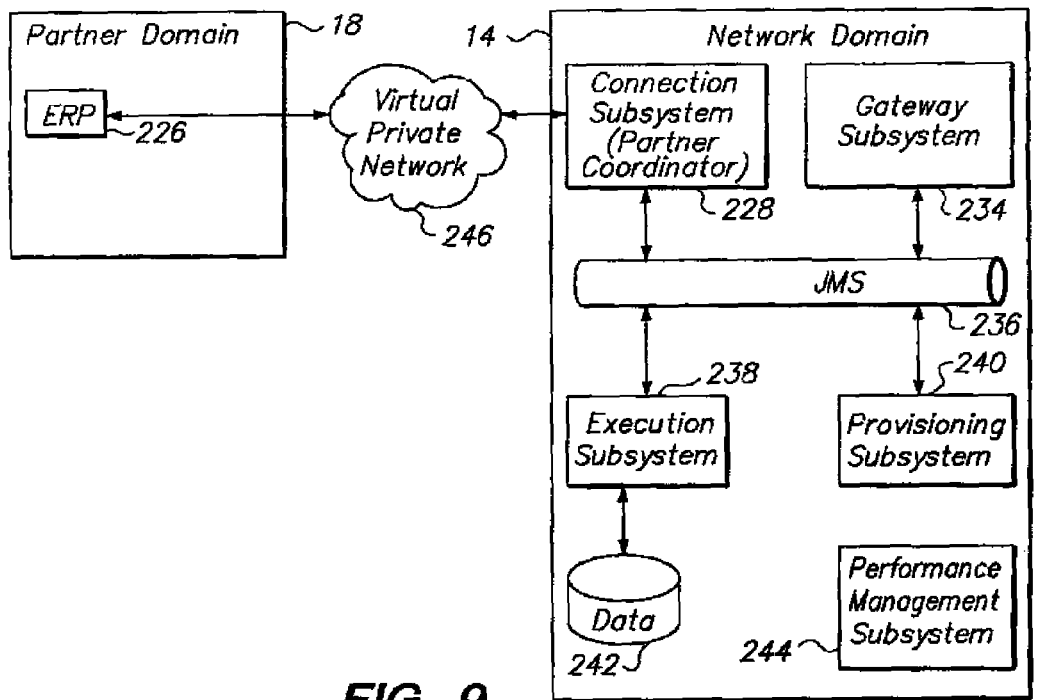
FIG. 9 illustrates a scenario for a business-to-business transaction, according to another embodiment of the present invention.
Figure 10:
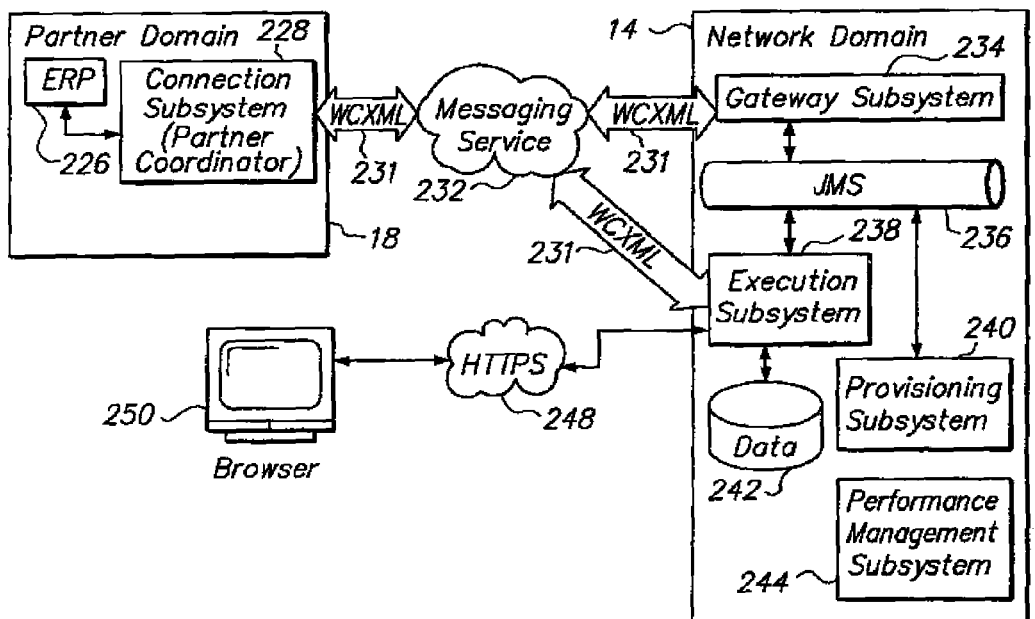
FIG. 10 illustrates a scenario for a business-to-consumer transaction, according to an embodiment of the present invention.

FIGS. 8-10 illustrate exemplary scenarios for interactions of entities in a network 10 for managing a supply chain.

Business-to-Business Transactions

FIG. 8 illustrates a scenario for an exemplary B2B (business to business) transaction, according to an embodiment of the present invention. In a typical B2B scenario, the entities involved with the transaction can be businesses, such as an enterprise and one or more partners. A partner domain 18 is associated with the partner, and a network domain 14 can be associated with the enterprise or one of its partners.

In this B2B scenario, a connection subsystem 228 resides within the partner domain 18. Data and information for the transactions may be transferred by a secure transport mechanism, i.e., a messaging service 232 (which can use HyperText Transfer Protocol (HTTP)), between the partner domain 18 and the network domain 14.

The connection subsystem 228 may send and receive eXtensible Markup Language (XML) messages 231 from the network domain 14 via the messaging service 232, may perform partner-specific data manipulation, and may communicate with the partner enterprise resource planning (ERP) applications or subsystems 226. The connection subsystem 228 may comprise a partner coordinator component 180. The connection subsystem 228 is shown as physically residing in the partner domain 18, but it could also reside in the enterprise domain 16 or the network domain 14.

In general, messages exchanged between one domain and another may or may not require context-based routing. In context-based routing, decisions for routing informational messages, requests, instructions, and the like are based on, for example, current state of business policy rules and at what step in a business process a transaction resides. When context-based routing is required, a gateway subsystem 234 in the network domain 14 may send and receive messages 231 from the partner domain 18 via a messaging service 232 (which may use HyperText Transfer Protocol (HTTP)). The gateway subsystem 234 may route those messages via Java Messaging System (JMS) 236 to other subsystems in the network domain 14. The gateway subsystem 234 can be an implementation of the network gateway 114 (FIG. 4). When context-based routing is not required, messages may be sent directly between the connection subsystem 228 and the execution subsystem 238.

The execution subsystem 238 may provide the process management services for generating requests and evaluating responses related to the transaction. The execution subsystem is shown as part of the network domain 14, but it could also be part of a partner domain 18 or the enterprise domain 16. The execution subsystem 238 may also be referred to or implemented as part of network execution component 214.

The performance management subsystem 244 functions to monitor the system performance statistics. The performance management subsystem 244 may be part of an administration component 216. The performance measurement subsystem 244 provides decision support to users based on graphs and reports. It also can define metrics for the performance (e.g., on-time delivery) of various entities in the supply chain. The performance management subsystem 244 can display the performance statistics in one or more reports on a GUI (e.g., "dashboard") to facilitate monitoring and management by a user. The reports and dashboards may be metric based. Custom structure query language (SQL) may define the report statistics.

The provisioning subsystem 240 may provide configuration and business rules for deploying the system. The provisioning subsystem 240 can be part of administration component 216. The provisioning subsystem 240 may be initialize the applications in network domain 14 in response to messages from partner domain 18. The provisioning subsystem 240 activities can manage or facilitate the management of partners, agreements, enterprise business units (EBUs), processes, and users. It may set up EBUs, associated relationships, as well as group and user entitlements (e.g., associating users to the appropriate level of security, etc.). It may be also responsible for creating rules and associating those rules to the appropriate processes and tasks which are governed by these policies. Provisioning subsystem 240 may receive requests to manage EBU and partnership activities. It may also service requests from the staff at an EBU to manage contract-related activities. The provisioning subsystem 240 may support the creation or collection of information relating to partners, users, groups, security, and network policy. Prior to a partner coming on line, this information may be defined by operations and professional services at an enterprise. This information may be stored in an LDAP repository. Thus, when the network system of network domain 14 receives a message from a partner, provisioning subsystem 240 may provide the appropriate uniform resource locator (URL) for the partner coordinator component 180 of that paltrier, the digital certificate, and other partner-specific information needed to generate a valid request. The user information may specify groups that the user belongs to and user policy information. The contracts or agreements between an enterprise and its partners may include policy information and collection information. For each partner, configuration properties may define the specifics for a partner configuration.

Data 242 can store the data and information received, generated, collected, or used by network domain 14. Data 242 can be implemented with any one or more suitable storage media, such as random access memory (RAM), read-only memory (ROM), disk drives, tape storage, or other suitable volatile and/or non-volatile data storage facility. Data 242 may be configured as a relational database.

FIG. 9 illustrates a scenario for an exemplary B2B transaction, according to another embodiment of the present invention. In this embodiment, the network domain 14, rather than the partner domain 18, hosts the connection subsystem 228. Communication with the partner ERP 226 may be through a virtual private network 246. The transport or exchange of messages and data between the gateway subsystem 234 and the connection subsystem 228 may be done via Java Messaging System (JMS) 236. This eliminates the XML transport steps described above for FIG. 8.

Business to Consumer Transactions

FIG. 10 illustrates a scenario for an exemplary B2C (business to consumer) transaction, according to an embodiment of the present invention. For customers of an enterprise or for partners without an enterprise resource planning (ERP) application or subsystem, or who would like to communicate via a Web browser, the network 10 supports a B2C model. In a typical B2C scenario, a customer or partner initiates a transaction directly to the execution subsystem 238 via a browser 250. Browser-based communication may be in the form of HyperText Transfer Protocol (HTTP) 248.

Nevertheless, the connection subsystem 228 may still send and receive eXtensible Markup Language (XML) messages 231 from the network domain 14, may perform partner-specific data manipulation, and may communicate with the partner ERPs 226.

Partner Coordinator Component

Figure 11:
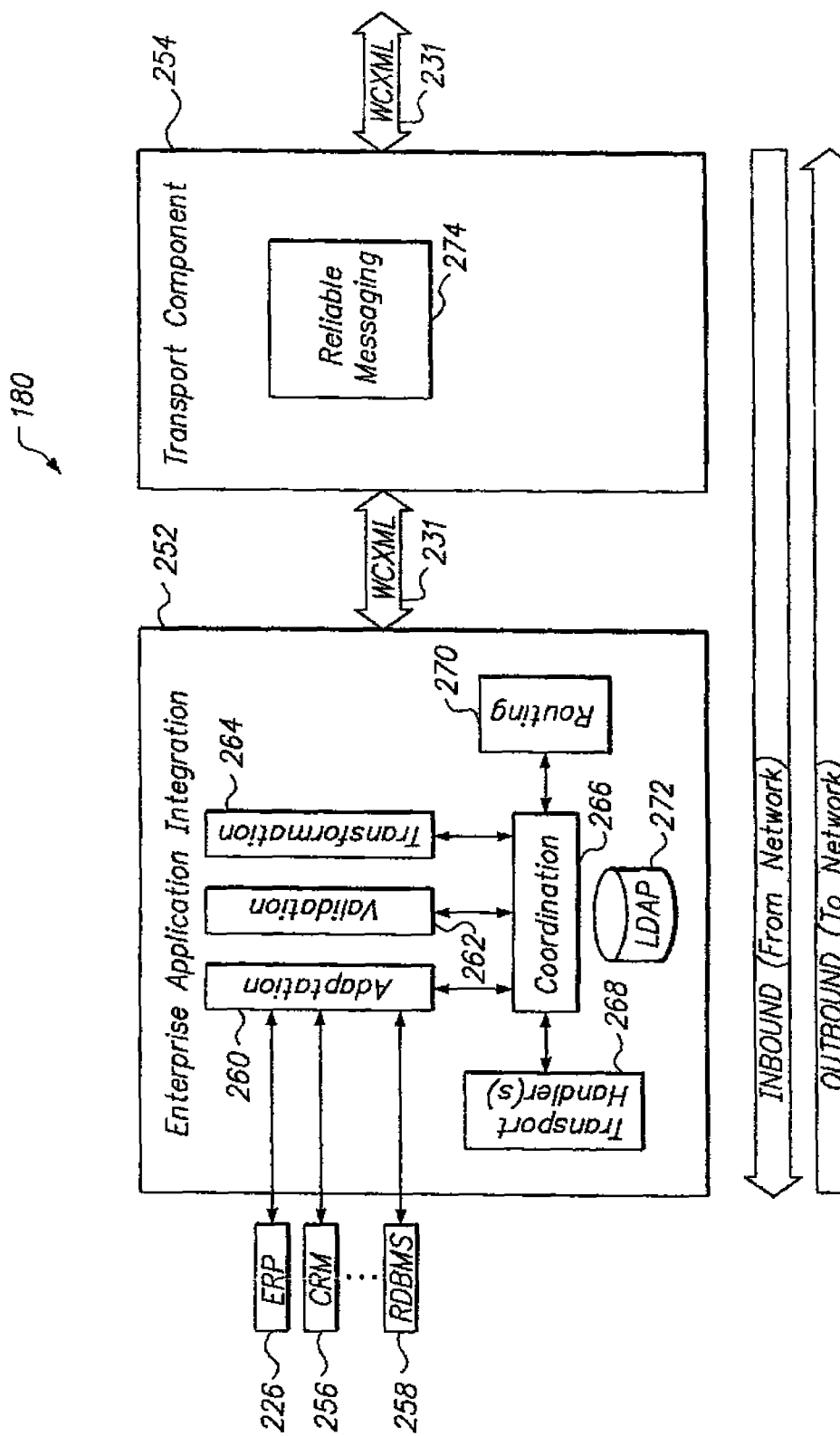
FIG. 11 illustrates an exemplary implementation of a partner coordinator, according to an embodiment of the present invention.

FIG. 11 illustrates an exemplary implementation of a partner coordinator component 180, according to an embodiment of the present invention. The partner coordinator component 180 may be part of or implemented in a connection subsystem 228. The partner coordinator component 180 may physically reside in the partner domain 18 (see e.g., FIG. 8) or the network domain 14 (see e.g., FIG. 9). The partner coordinator component 180 may provide the conduit and may control functions between the network domain 14 and a partner domain 18. The partner coordinator component 180 may include distributed process control logic to make decisions (i.e., issue commands or instructions) for workflows or business processes in process execution 132. The partner coordinator component 180 may be responsible for reliably connecting a remote partner to the network system 10. This allows for the exchange of eXtensible Markup Language (XML) messages 231 to deliver real-time content, data, and information and to initiate actions. The partner coordinator component 180 may use a LDAP database 162 for policy rules, configuration data, and other relevant information.

As depicted, partner coordinator component 180 includes an enterprise application integration component 252 and a transport component 254.

Enterprise application integration component 252 generally functions to integrate the systems application of a partner with the network 10. These existing partner applications can include an enterprise resource planning (ERP) 226, customer resources management (CRM) 256, relational database management system (RDBMS) 258 applications or systems, and any type of enterprise application or system.

The EAI component 252 may be implemented with partner-specific business policy code that performs the data manipulation and local process control particular to the partner requirements and for communicating with the ERP 226, CRM 256, and RDBMS 258 applications or systems. The EAI component 252 may include routing component 270, coordination component 266, adaptation component 260, validation component 262, transformation component 264, and transport handler component 268.

Adaptation component 260, validation component 262, and transformation component 264 operate on data or information which is exchanged between the existing partner applications or systems (e.g., ERP 226, CRM 256, and RDBMS 258) and the network domain 14. Adaptation component 260 may convert or adapt the data and information between a format that is usable and understood by the existing partner applications and a format that is usable and understood by the components and applications in the network domain 14. Validation component 262 validates the data and information, for example, by considering the date of the information and/or its source. Validation component 262 may also validate data relating to any give transaction against a context of process state that is maintained for such transaction. For example, if a purchase order to a supplier specifies 100 units of a particular product at a price of $1.00 per unit, a validation component 262 will review or validate any confirmation received from the supplier to ensure consistency with the purchase order in terms of quantity (100) and cost ($1.00 per unit). The context of the purchase order is used to semantically validate the corresponding confirmation.

Transformation component 264 transforms the information and data to the network domain 14 using XML messages.

Routing component 270 may determine which existing partner application or system (e.g., ERP 226, CRM 256, and RDBMS 258) should handle a particular message received from the network domain, and then route the message to the appropriate existing partner application or system.

In one embodiment, the partner coordinator component 180 may include the EAI-based applications 252 logic for data transformation 264, event coordination 266 with enterprise applications and messaging connectivity back to the network domain 14. This logic may be built on top of a commercial enterprise application integration server, such as, the Vitria JDBC Connector Toolkit, which is capable of exchanging events with applications using a relational database. In this embodiment, the partner coordinator component 180 also may include cached data and business logic available to the enterprise application for real-time data validation and access. Thus, the enterprise domain 16 or the network domain 14 can retrieve real-time information or data as necessary to monitor events or transactions and coordinate workflows and business processes. Informed decisions can be made for business processes. The customer or partner may have a "Ship Me" button embedded in the application linking the order logic to the network domain 14.

An LDAP 272 can store policy rules and configuration information or data generated or received by EAI 252. LDAP 272 can be implemented with any one or more suitable storage media, such as random access memory (RAM), read-only memory (ROM), disk drives, tape storage, or other suitable volatile and/or non-volatile data storage facility. LDAP 272 may be configured as a relational database.

The transport component 254 may include a reliable messaging service component 274 and implements the functional and deployment requirements for exchanging messages between partner domain 18 and network domain 14. It may support transport via HyperText Transfer Protocol (HTTP), HyperText Transfer Protocol Secured (HTTPS), and Java Messaging System (JMS). Transport component 254 may implement a reliability algorithm to ensure all messages are delivered end-to-end. The transport component 254 may use or support sequence numbers, persistent messaging, acknowledgment of receipt, retry management (e.g., configurable timeout interval, configurable number of retries, and configurable retry interval), and database and file-based logging and auditing. The transport protocol may be transparent to the partner domain 18, and allows for scalability and extensibility of messaging services.

Coordination component 266 manages or coordinates the handling of messages and the processing of information or data associated therewith. Coordination component 266 may include distributed process control logic to issue commands or instructions to each of routing component 270, adaptation component 260, validation component 262, transformation component 264, and transport handler component 268 in EAI component 252.

The partner coordinator component 180 may be stateless. However, the functionality of the partner coordinator component 180 may be stateful, meaning that the local business processes performed therein are persistent. For example, a local business process may be implemented to coordinate a transaction across multiple local applications that are resident at an enterprise domain 16 or a partner domain 14. The partner coordinator component 180 may support common protocols such as simple object access protocol (SOAP), Microsoft BizTalk, ebusiness XML (ebXML), SAP intermediate documents (IDOCS), Electronic Data Interface (EDI), and File Transfer Protocol (FTP). A RosettaNet XML document could be transformed into XML, which is recognizable by the network domain 14. Third party connectors may exist for some of these protocols.

Network Domain Gateway

Figure 12:
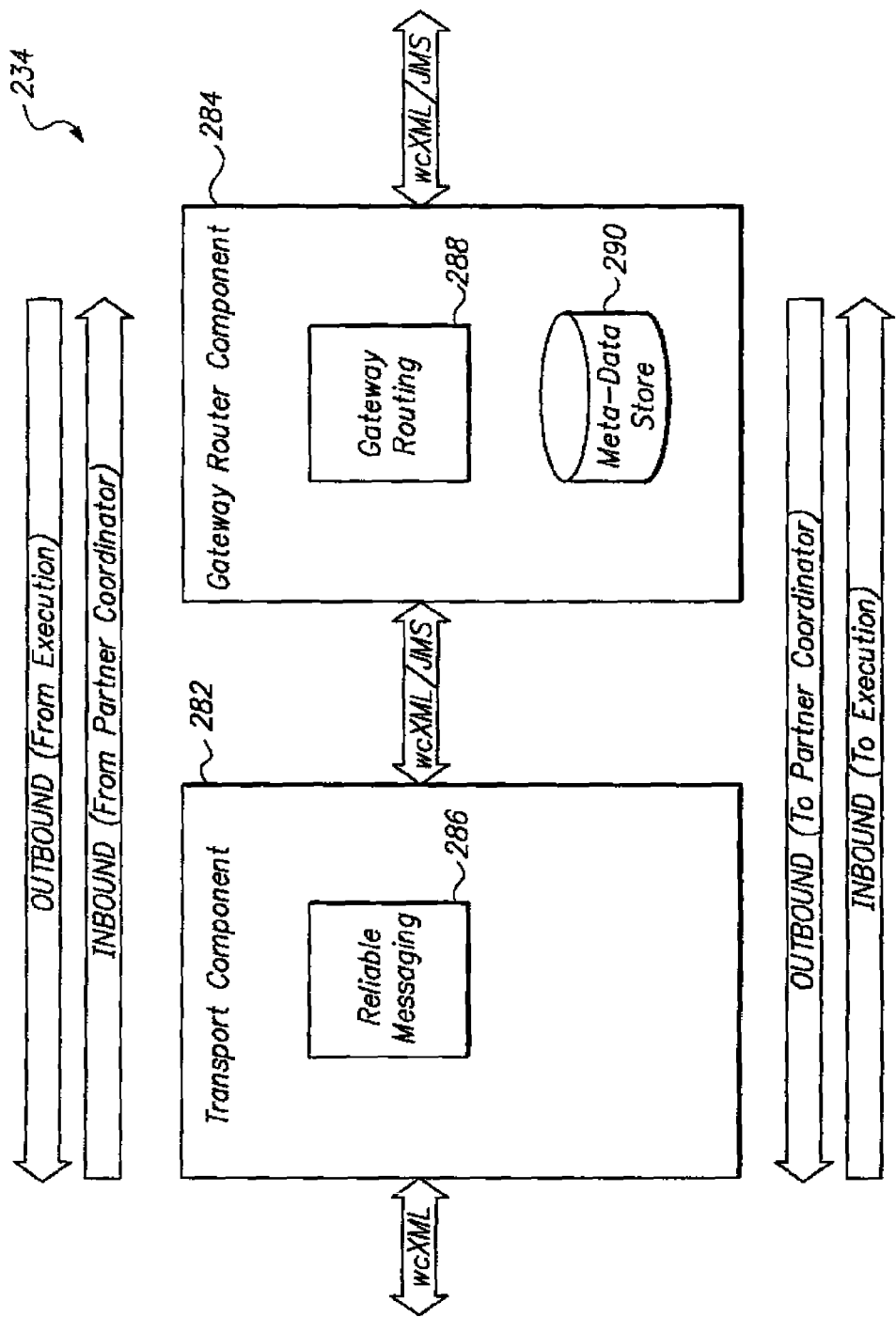
FIG. 12 illustrates an implementation of a network domain gateway, according to an embodiment of the present invention.

FIG. 12 illustrates an implementation of a network domain gateway 114, according to an embodiment of the present invention. The network domain gateway 114 may be part of or implemented in the gateway subsystem 234. The network domain gateway 114 may physically reside in the enterprise domain 16, the network domain 14, or the partner domain 18.

The network domain gateway 114 may be responsible for message routing on the network domain 14 side and may be complementary to the partner coordinator component 180. It may have transport functionality to communicate with the partner coordinator component and gateway routing functionality to communicate with the other subsystems of the network domain.

As depicted, the network domain gateway includes a transport component 282 and a gateway router component 284. The gateway transport component 282 may be a complement (and functionally equivalent) to the connector transport component 254 in a partner domain 18. It may provide a reliable messaging services component 286 on the network domain 14 side. The gateway transport component 282 may cooperate with the partner coordinator transport component 254 to exchange messages between the respective domains.

In one embodiment, at least one partner connection subsystem 228 for each partner domain 18 can be identified with a unique IP address. However, there is only one IP address exposed by the gateway transport component 282 in the network domain 14.

The gateway router component 284 may route messages (in the format of an eXtensible Markup Language (XML) document) between the execution subsystem 238 and the partner connection subsystem 228. The gateway router component 284 may listen on the Java Messaging System (JMS) channel 236 for requests. When it receives a request message, it processes that request and generates the XML message to send to the partner. The message may contain all the routing information (including its own IP address for return messages) and security information as well as the payload. The message may be sent to the transport component 282. The routing information may be provisioned. The logic of gateway router component 284 may be implemented with a gateway routing 288 application or process. The metadata store 290 is an LDAP repository for configuration and policy rules for use by gate routing 288 application. Furthermore, the gateway router component 284 may forward messages received by transport component 282 from partner domains 18 or enterprise domain 16. When the gateway router component 284 receives a message from the transport component 282, it may validate the XML, extract the payload, and route the payload to the appropriate process manager in the execution subsystem 238 by publishing the message as a XML document to the appropriate JMS message channel 236. A message header for each message may specify such things as the enterprise business unit (EBU) or the entity (e.g., company name) and the sourcing or business contract (which basically acts as a filter). A routing table in gateway routing 288 may be defined in the provisioning subsystem 240 with pre-defined filters.

Metadata store 290 can be implemented with any one or more suitable storage media, such as random access memory (RAM), read-only memory (ROM), disk drives, tape storage, or other suitable volatile and/or non-volatile data storage facility. Metadata store 290 may be configured as a relational database.

The functionality of transport component 282, gateway router component 284, reliable messaging component 286, and gateway routing component 288 can be performed by any suitable processor such as a main-frame, file server, workstation, or other suitable data processing facility running appropriate software and operating under the control of any suitable operating system, such as MS-DOS, MacINTOSH OS, WINDOWS NT, WINDOWS 2000, OS/2, UNIX, XENIX, GEOS, and the like.

Execution Subsystem

Figure 13:
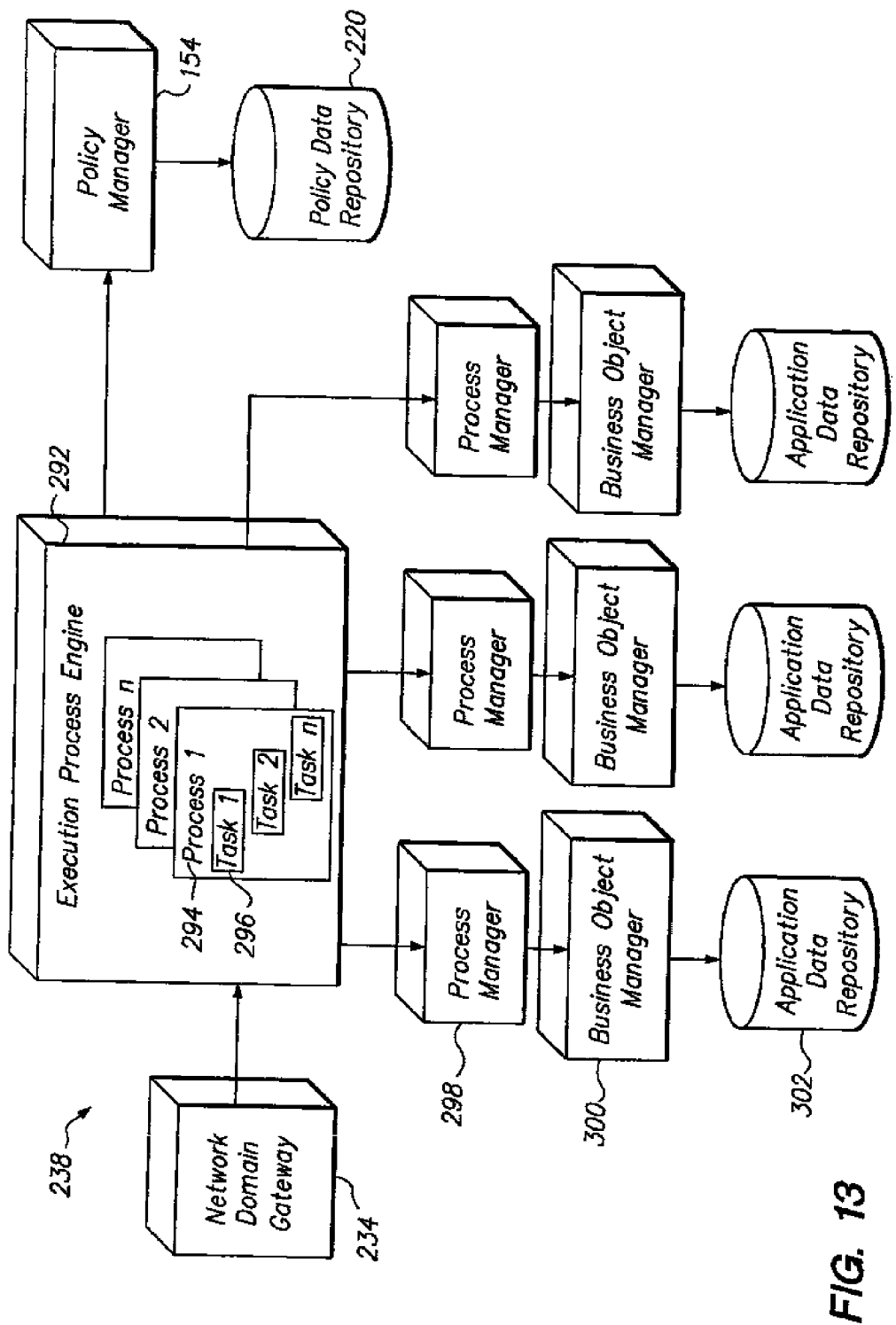
FIG. 13 illustrates process execution on an execution subsystem, according to an embodiment of the present invention.

FIG. 13 illustrates process execution on an execution subsystem 238, according to an embodiment of the present invention. The execution subsystem 238 may include a network execution component 214. The execution subsystem 238 may physically reside in the network domain 14 or the enterprise domain 16. Data, a transaction, a demand, a message, or a request for a transaction may enter the execution subsystem 238 through an interface or the network domain gateway 234. As depicted, execution subsystem 238 may comprise an execution process engine 292, one or more process managers 298, one or more business object managers 300, and a policy manager 154.

The execution process engine 292 may execute one or more processes 294 and facilitate the creation, customization, and monitoring of the same. Each process 294 may perform business logic on data. A process can be a computer-executed action that transforms data according to specified business rules. Processes 294 can be reusable by different workflows. For example, a business exception workflow 140 and an exception workflow 142 may call a common process 294 for managing exceptions or calculating interest. Processes 294 may be granular and perform a specific piece of functionality. As processes 294 execute, one or more business objects may be generated, created, received, exchanged, passed, or acted upon within the network—i.e., in the network domain 14, a partner domain 18, the enterprise domain 16, or a customer domain 20. The business objects enable the tasks 296 of each process 294 to be performed. Business objects may convey or comprise data or information and executable routines for the performance of tasks 296. Business objects can be associated with specific transactions which occur in the supply chain, such as purchase orders, shipment receipts, and invoices. Business objects may be transformed as the processes are run, for example, so that the status of the associated transactions is updated.

In particular, a process 294 may implement one or more tasks 296. There may be two categories of task components 296 within a process component 294: action tasks and policy tasks. Action tasks may perform specific actions, while policy tasks may facilitate the interrogation of policy rules from the policy manager component 154. The policy manager component 154, in turn, may get the policy rules from the LDAP database (policy data repository 220).

The process manager components 298 are each associated with a respective process 294. Each process manager 298 manages the respective business process, thus governing the flow of business objects through the application. A business object may be generated by an enterprise application or by a third-party system. A process manager 298 may enforce the policies and procedures for the enterprise or partners in the supply chain. This allows automated inter-entity communication and collaboration.

The business object managers 300 are each associated with a respective process manager 298 and process 294. Each business object manager 300 may manage the state and the history of all business objects, such as purchase orders, shipment receipts, and invoices for the respective process 294. Information or data relating to the purchase order, shipment receipts, invoices, etc. may constitute transaction data. Information or data relating to inventory levels, parts numbers, etc. may constitute reference data. As business objects change status from creation to approval, rejection, or cancellation, a critical history of all changes and the audit trail associated with the changes may be recorded. Thus, the context of a transaction may be maintained. The business object managers 300 may ensure that the business policies are uniformly enforced whether a business object is created by a web user or via a business message.

Each business object manager 300 may be responsible for servicing requests initiated by the execution process engine 292. For example, if the request is to create a Purchase Order (PO), a corresponding process 294 delegates the request to the appropriate business object manager 300 to create the PO on the customer's behalf. In other words, the business object manager 300 may provide an abstraction layer to the database access, for application data repositories 302. Application data repository 302 acts as a proxy to the enterprise or partner applications and contains accurate status of transaction and reference information. Transaction information may include the status of a transaction, such as approval, rejection, or cancellation, a critical history of all changes, and the audit trail associated with the changes. Reference information may include information relating to a partner, such as parts numbers. Furthermore, every process 294 within the execution process engine 292 may have an exception management subprocess to handle exception conditions.

Based on the business process that enters or is initiated by the network system, the execution process engine 292 may call on the policy manager 154. The policy manager 154 may maintain all the business policies and practices specific to an entity's way of doing business and may be used to ensure that the process flow does not violate institutional conditions. In one embodiment, the policy manager 154 may provide isolation from underlying security and business policy management tools such as Netegrity, which provide scalability and integration with systems used by Tibco, Yahoo, Cisco and other large-scale portal operators. Netegrity may provide integration with all major web application servers and operating systems, such as Apache, NT, Solaris, and BEA Weblogic. In one embodiment, the policy manager 154 may provide role-based access control down to data level and support single-sign on. The policy manager 154 may be based on the government-level security model called Role-Based Access Control (RBAC). The policy manager 154 may employ an LDAP-based security repository, such as policy data repository 220, for user and policy definitions providing single-sign on support. Policy data repository 220 contains the business policy rules used by multiple components in the network 10.

The application data repository 302 and the policy data repository 220 can be implemented with any one or more suitable storage media, such as random access memory (RAM), read-only memory (ROM), disk drives, tape storage, or other suitable volatile and/or non-volatile data storage facility. The application data repository 302 and the policy data repository 220 may be configured as relational databases.

In one embodiment, the policy data repository 220 may implement the LDAP-based policy definition schema for access by application components. This model may support a very sophisticated business policy model for policies such as error and event policies (e.g., escalation and other clauses), security policies, service policies (e.g., order commitments, inventory availability), and others. This model can be based on the ECA (event-condition-action) rule formats. The storage of policy rules in the LDAP directory may allow for development of provisioning and configuration tools using reusable templates. These rules can be attached to any network node (MS queue). The network platform can have intelligent algorithms using the LDAP policy rules for dynamic reconfiguration and decision making for routing and automated error correction.

The functionality of execution engine component 292, process manager component 298, business object manager component 300, and policy manager component 154 can be performed by any suitable processor such as a main-frame, file server, workstation, or other suitable data processing facility running appropriate software and operating under the control of any suitable operating system, such as MS-DOS, MacINTOSH OS, WINDOWS NT, WINDOWS 2000, OS/2, UNIX, XENIX, GEOS, and the like.

Hardware Implementation

Figure 14A:
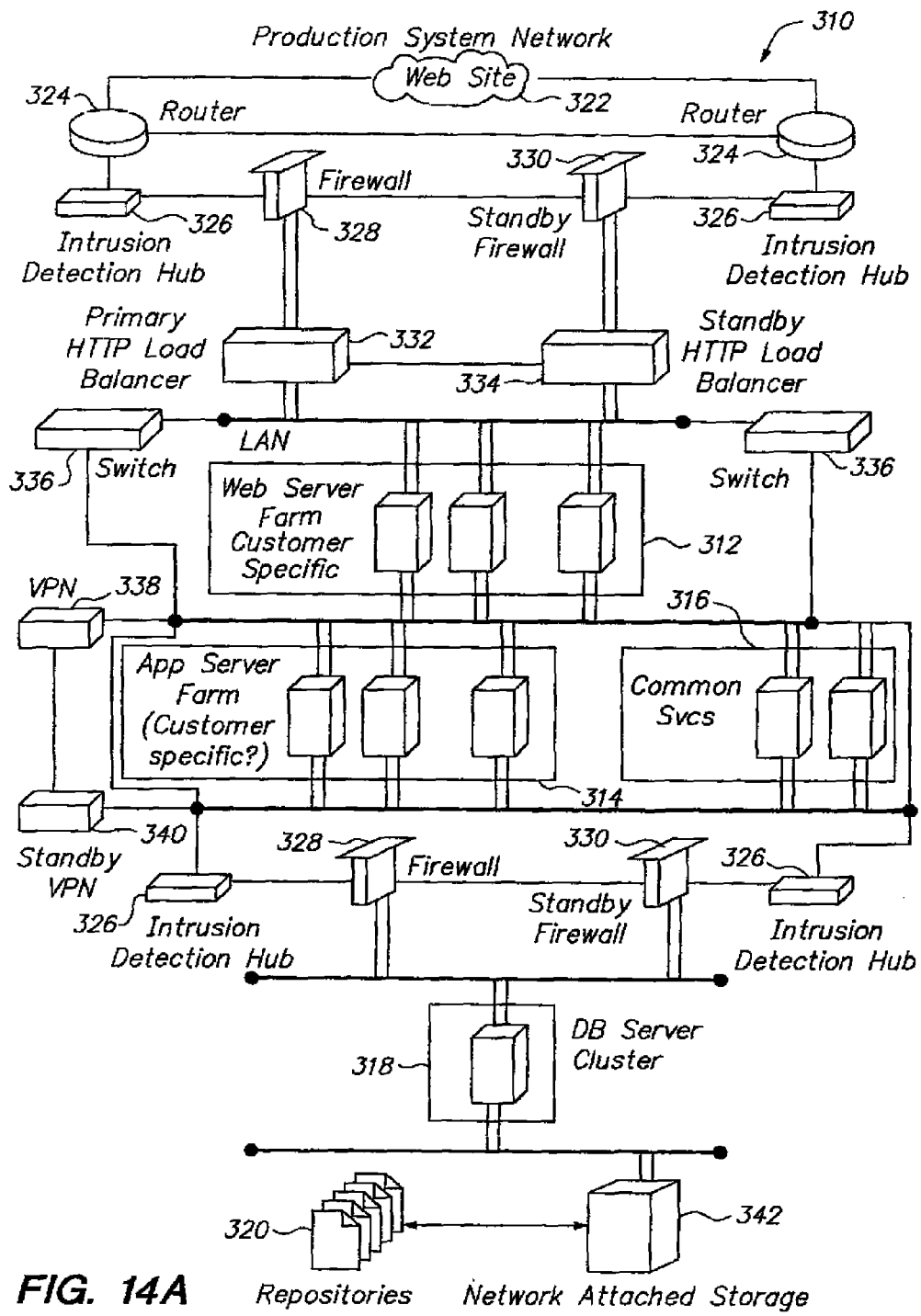
FIG. 14A illustrates an exemplary hardware implementation for a network for managing a supply chain, according to an embodiment of the present invention.

FIG. 14A illustrates an exemplary hardware implementation 310 for a network 10 for managing a supply chain, according to an embodiment of the present invention. This implementation 310 may provide the general infrastructure for a network hosted production system environment. Different configuration options are possible depending upon the size and mix of the partners and the expected transaction or message rate.

The hardware implementation 310 may provide a deployment architecture which comprises three layers. The top layer may include a web server farm 312 that may provide load-balancing and fail-over redundancy services. The load balancing may route an incoming request to the appropriate application server in the middle layer. Fail-over redundancy services may be provided by a minimum of two web servers per partner. In one embodiment, for three partners, there may be three web server farms located in the hub. The hub typically resides within the network domain 14, although a partner may elect to host its own data in the partner domain 18.

The middle layer may include an application server cluster 314 that may provide application services. Fail-over redundancy may be provided by a minimum of two servers. This middle layer also may include a common services server cluster 316 that provides services common to all applications. Fail-over redundancy may be provided by a minimum of two application servers and two common services servers.

The bottom layer contains the database servers 318. The database servers 318 may provide needed fail-over redundancy and storage therein may utilize a redundant array of independent disks (RAID) configuration to mirror the data. Fail-over redundancy may be provided by a minimum of two database servers. The database repositories 320 may be stored using network attached technology to provide flexibility.

Some of the servers and database may be shared while others may not be shared. The web servers 312, application servers 314, and databases are typically unshared, while the common services servers 316 and the database servers 318 are typically shared.

The subsystems, components, databases, and data repositories of the network domain 10 described herein can be implemented in one or more servers in different application layers of hardware implementation 310.

Routers 324, firewalls 328, intrusion detection hub 326, HTTP load balancer 332, switch 336, VPN 338, repositories 320, and network attached storage 342 are also provided in this implementation 310.

Figure 14B:
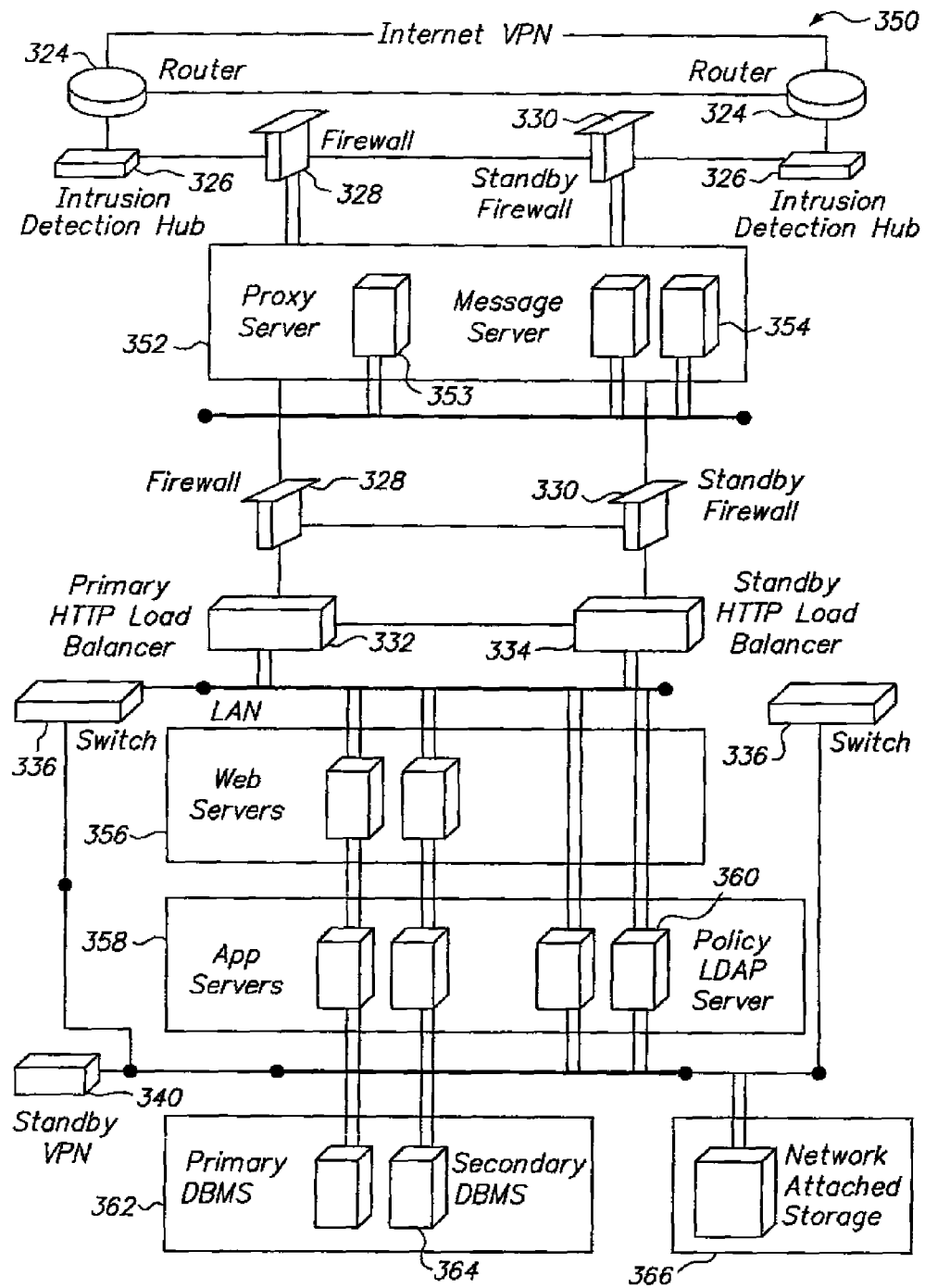
FIG. 14B illustrates another exemplary hardware implementation for a network for managing a supply chain, according to an embodiment of the present invention.

FIG. 14B illustrates another exemplary hardware implementation 350 for a network 10 for managing a supply chain, according to an embodiment of the present invention. The physical view of this implementation 350 reveals a high-level perspective of the software stack, both custom and third-party components, as well as an exemplary hardware deployment configuration, which illustrates the distribution of the software components. The configurations may be revised based on the performance characteristics of the actual platform implementation.

The implementation 350 may provide redundant network components that provide fail over. The network infrastructure of this implementation 350 may include routers 324, intrusion detection hubs 326, and primary HyperText Transfer Protocol (HTTP) load balancers 332, 334. Fail over may be provided for by the use of multiple components. Multiple border routers 324 may provide high reliability. Redundant firewalls 328, 330 may be configured as primary 328 and standby 330. Multiple HTTP Load Balancers 332, 334 may be configured for fail over. This implementation also includes switches 336 and standby virtual private network (VPN) component 340.

The network may support two levels of firewalls, an inner firewall and an outer firewall. The inner firewall may interface between the demilitarized zone (DMZ) and the backend application. The inner firewall may allow communications across Transmission Control Protocol/Internet Protocol (TCP/IP) and HTTP(s). The outer firewall may interface between the DMZ and the Internet. The outer firewall may allow communication across HTTP(s).

Major software components may run on web server 356, messaging server 354, application server 358, and persistent data servers. Each server may be configured with multiple NIC cards to provide fail over local area network (LAN) reliability.

The web servers 356 can be part of a web services layer which may handle browser-based input into the system. This web services layer may also include a proxy server 353. The web services layer may receive requests and delegate them to a policy server 360 for authentication or authorization. The request may be forwarded to a specified application server 358. Each web server 356 may map directly to an application server 358.

The messaging server 354, which resides in the DMZ, may handle B2B input into the system using XML and other protocols. Each messaging server 354 may receive requests and delegate them directly to the application servers 358 (thus, bypassing the web servers 356). The messaging servers 354 can be clustered.

The application servers 358, which can be part of an application services layer, may provide application services. This layer also may includes an LDAP and policy server 360 that may provide data services that are common to all applications. Fail-over redundancy may be provided by a minimum of two servers.

The database servers 362, 364 may provide needed fail-over redundancy with a minimum of two servers. A network attached storage 366 may utilize a redundant array of independent disks (RAID) to mirror the data. The database repositories may be stored using network attached technology 366 to provide flexibility.

Different configuration options for hardware implementations 310 and 350 depicted in FIGS. 14A and 14B are possible depending upon the size and mix of the partners, in terms of transaction rates. For small size customers, low capacity disks and less-expensive machines, such as single central processing unit (CPU) with less memory, can be used for web server hosts 356 in the web server farms 312. Alternatively, high capacity machines can be used to host all the services needed. Separate machines may be used to host application services.

In one embodiment, UNIX machines with capacity of four CPU and two to four GB memory may be used for the application server hosts 358. Alternatively, a single CPU with a minimum of 1G of memory may be used. For large customers, the application server hosts can be dedicated to host their specific application server clusters. The application server host 358 may be equipped with large capacity hard disk to accommodate logging. If file-based message persistence is chosen for the JMS Service, then a large capacity hard disk may be required.

In one embodiment, the messaging service server hosts 354 may use UNIX machines with a capacity of four CPUs and two to four GB of memory. Alternatively, one CPU with 2 GB of memory may be used, and more memory or CPUs may be added as the load increases.

In one embodiment, database server hosts 362, 364 may be UNIX machines with a capacity of four CPUs, and two to four GB of memory. Alternatively, two CPUs with two GB of memory each may be used, and more memory or CPUs may be added as the load increases.

For a small system, an average transaction rate of 400 transactions per day is expected with three transactions per minute at peak time. For a medium system, an average transaction rate of 10,000 transactions per day is expected with 70 transactions per minute at peak time. For a large system, an average transaction rate of 30,000~50,000 transactions per day is expected with 210~350 transactions per minute at peak time.

Graphical User Interface

FIG. 15 illustrates a screen shot for a graphical user interface 370, according to an embodiment of the present invention. As depicted, the graphical user interface 370 may include an alerts component 372, a documentation component 374, a tasks component 376, a depot inventory levels component 378, and a reports component 380.

The graphical user interface 370 may provide an enterprise and its partners with dynamic, consistent context-based information to be shared, updated, and acted on according to stringent policy-based application and business rules set up by key performance indicators. This allows for a uniform view of the information whether the information originated in an enterprise application or a partner application across the entire supply chain network. The graphical user interface 370 can be customized to specify key business indicators of an enterprise or of a partner. Using real-time alerts and exception handling via wireless or e-mail, notifications based on key performance indicators may be sent to decision-makers at an enterprise or a partner proactively before the customer is even aware of a potential situation.

The graphical user interface 370 may includes data analysis, aggregation, and reporting capabilities. The graphical user interface 370 may includes functional capabilities including configuration and administration of business rules, creation of customizable service level agreement (SLA) parameters, management of key performance metrics, and enhanced capabilities including data entry and processing. For example, using report component 380, an enterprise or a partner may configure critical reporting metrics, view key performance indicators, and set proactive alert parameters in a real-time environment. Customized administrative tools and functional screens allow the enterprise or the partner to execute process steps and controls in an automated fashion.

The alert component 372 may provide or support sophisticated alert handling, exception management, and event management capabilities. Alerts may include actions and trigger conditions, such as order volumes exceeding a specified amount, maximum time allowed for an activity being reached, or an SLA being violated. Alerts may be classified by severity according to specific business process and/or product control thresholds. A user can define who receives an alert based on the alert name, alert severity, and alert context. Notifications may be transmitted via wireless application protocol (WAP), email, or pager. Escalation processes and specific message text can also be customized to meet a user's specific needs.

Documentation component 374 may provide or support access to the documentation for the services and tools provided in network 10. Tasks component 376 may provide or support the management of tasks that should be performed in order to manage the supply chain. Such tasks may include transactional business logic with full data validation and forms for transferring inventory between different warehouse locations, checking inventory levels, checking the status of sales orders, shipments, etc. With tasks component 376, a user at an enterprise can assign tasks to appropriate persons at the enterprise or at a partner for handling.

Depot inventory levels component 378 provides or supports the presentation of up-to-date information or data on the inventory levels, for example, at one or more partner warehousing facilities.

Reports component 380 allows the user to create one or more reports that identify and track metric activities over specified periods of time. It allows each respective user, including tactical managers and strategic leaders, to select key performance metrics and represent these metrics in viewable reporting formats and constraints that are important to them. Such reports can include daily dispatches 382, and weekly dispatches 384.

The graphical user interface 370 provides a personalized control center for visibility and control into a supply chain. The graphical user interface 370 is fully customizable with the drill-down capabilities to view more specific information. With the graphical user interface 370, an enterprise understands the extended supply chain of itself and its partners and end-customers, thereby providing the ability to respond rapidly and efficiently to enhance customer satisfaction while reducing operating costs.

Business to Business Transaction

Figure 16A:
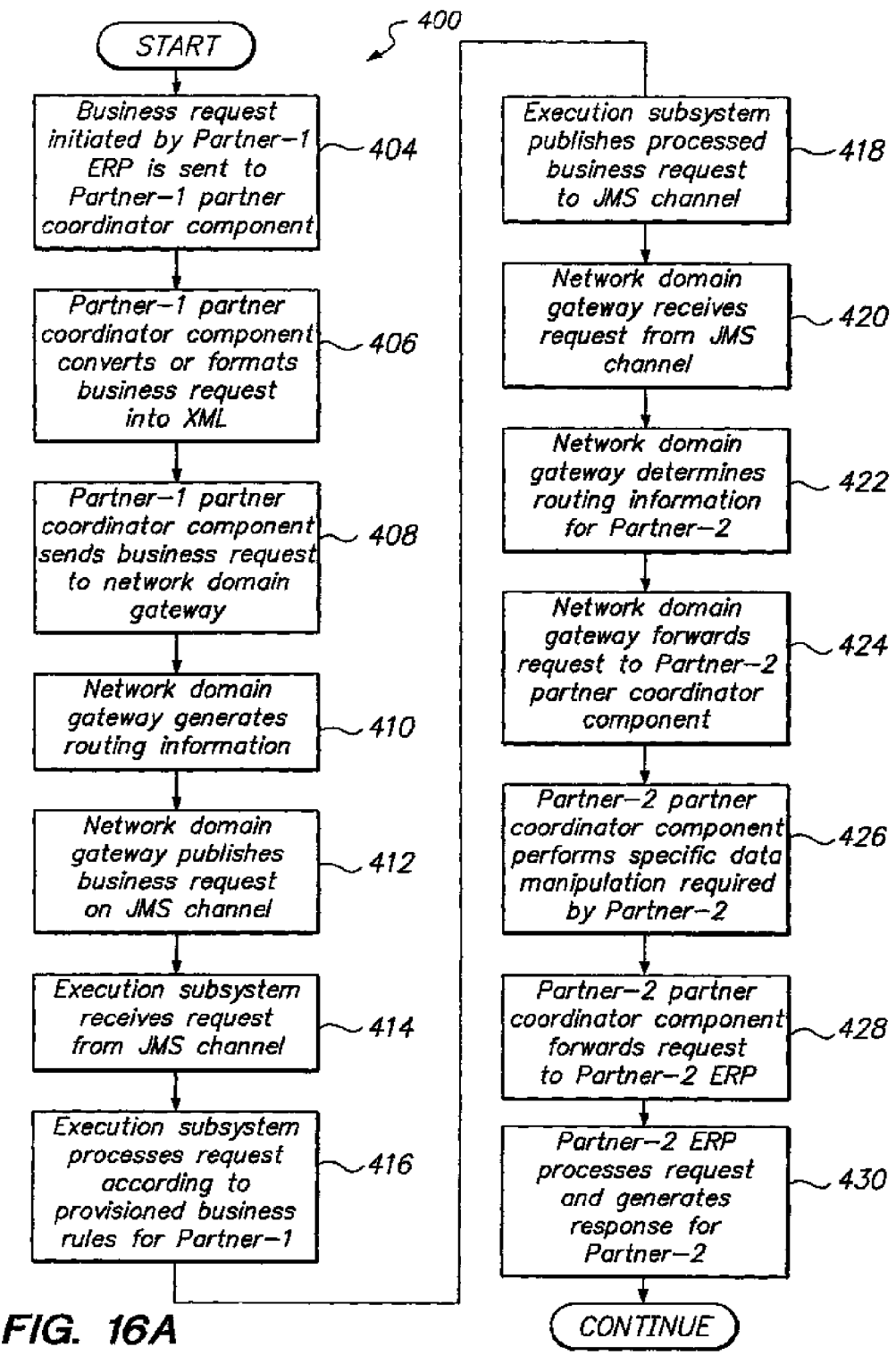
FIGS. 16A and 16B illustrates a flow chart of an exemplary method for a business-to-business transaction, according to an embodiment of the present invention.
Figure 16B:
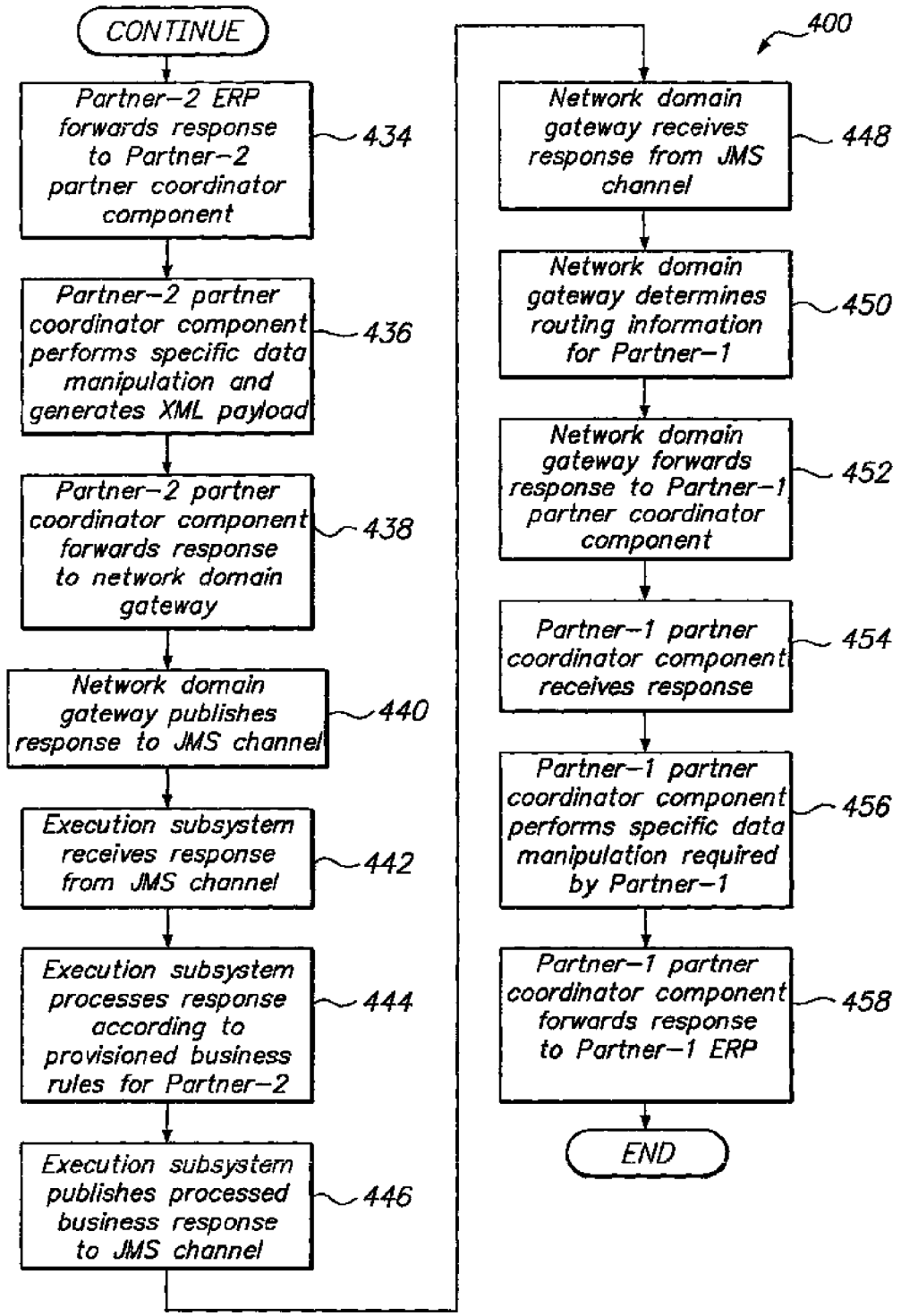

FIGS. 16A and 16B (collectively referred to as "FIG. 16") illustrate a flow chart of an exemplary method 400 for a B2B transaction, according to an embodiment of the present invention. Method 400 outlines a typical B2B transaction between two partners through the network system 10. Each partner maintains its own separate partner domain 18 that communicates with the network domain 14. This example assumes that routing is context-based. The transaction can be initiated when a Partner-1 receives, for example, a purchase order from a customer. Partner-1 can be a call center which takes orders. Partner-1 may generate a business request for the purchase order.

Method 400 begins at step 404 where the business request initiated by Partner-1 ERP 226 is sent to the partner coordinator component 180 of Partner-1 in a respective partner domain 18. The Partner-1 ERP 226 may be an example of an enterprise application 210. The Partner-1 partner coordinator component 180 may comprise or be part of a connection subsystem 228. At step 406, the Partner-1 partner coordinator component 180 converts or formats the business request into wcXML message. At step 408, the Partner-1 partner coordinator component 180 sends the request from partner domain 18 over a secure transport mechanism (e.g., XML transport mechanism) to the network domain gateway 114 of the network domain 14.

The network domain gateway 114 may comprise or be a part of the gateway subsystem 234. At step 410, the network domain gateway 114 receives the business request from the message and generates the appropriate routing information for handling the request. At step 412, the network domain gateway 114 publishes the request on an appropriate channel of the Java Messaging Service (JMS) 236.

At step 414, the execution subsystem 238 listens for and receives the request on the JMS channel. The execution subsystem 238 may implement network execution component 214. At step 416, the execution subsystem 238 processes the request according to the provisioned business rules defined for Partner-1. These business rules may be stored in policy data repository 220. The business rules may dictate that a Partner-2 should handle the request, for example, to fill the purchase order. At step 418, the execution subsystem 238 publishes the processed business request to the JMS channel.

At step 420, the network domain gateway 114 listens for and receives the request on the JMS channel. At step 422, the network domain gateway 114 determines the routing information for Partner-2, based on the execution subsystem 238 processing. At step 424, the network domain gateway 114 forwards the request to the partner coordinator component 180 of Partner-2 in the respective partner domain 18. Partner-2 can be a third-party warehousing provider which stores inventories of the enterprise's products.

At step 426, the Partner-2 partner coordinator component 180 receives the request and performs the specific data manipulation required by Partner-2. At step 428, the Partner-2 partner coordinator component 180 forwards the request to the Partner-2 ERP 226.

At step 430, the Partner-2 ERP 226 processes the request and generates a response for Partner-2. Processing of the request can include initiating action by Partner-2, for example, to fill the specified purchase order. At step 434, the Partner-2 ERP 226 forwards the response to the Partner-2 partner coordinator component 180.

At step 436, the Partner-2 partner coordinator component 180 performs specific data manipulation required by the Partner-2 ERP 226 and generates the wcXML payload. At step 438, the Partner-2 partner coordinator component 180 forwards the response to the network domain gateway 114 of the network domain 14.

At step 440, the network domain gateway 114 routes the response to the execution subsystem 238 by posting it on the JMS channel. At step 442, the execution subsystem 238 listens for and receives the request on the JMS channel. At step 444, the execution subsystem 238 processes the request (PO fulfillment) according to the provisioned business rules defined for Partner-2. At step 446, the execution subsystem 238 publishes the processed business response to the JMS channel.

At step 448, the network domain gateway 114 receives the response. At step 450, the network domain gateway 114 determines the routing information for Partner-1. At step 452, the network domain gateway 114 forwards the business response to the Partner-1 partner coordinator component 180 in the respective partner domain 18.

At step 454, the Partner-1 partner coordinator component 180 receives the business response. At step 456, the Partner-1 partner coordinator component 180 performs specific data manipulation. At step 458, the Partner-1 partner coordinator component 180 forwards the response to the Partner-1 ERP 226.

Business to Consumer Transaction

Figure 17A:
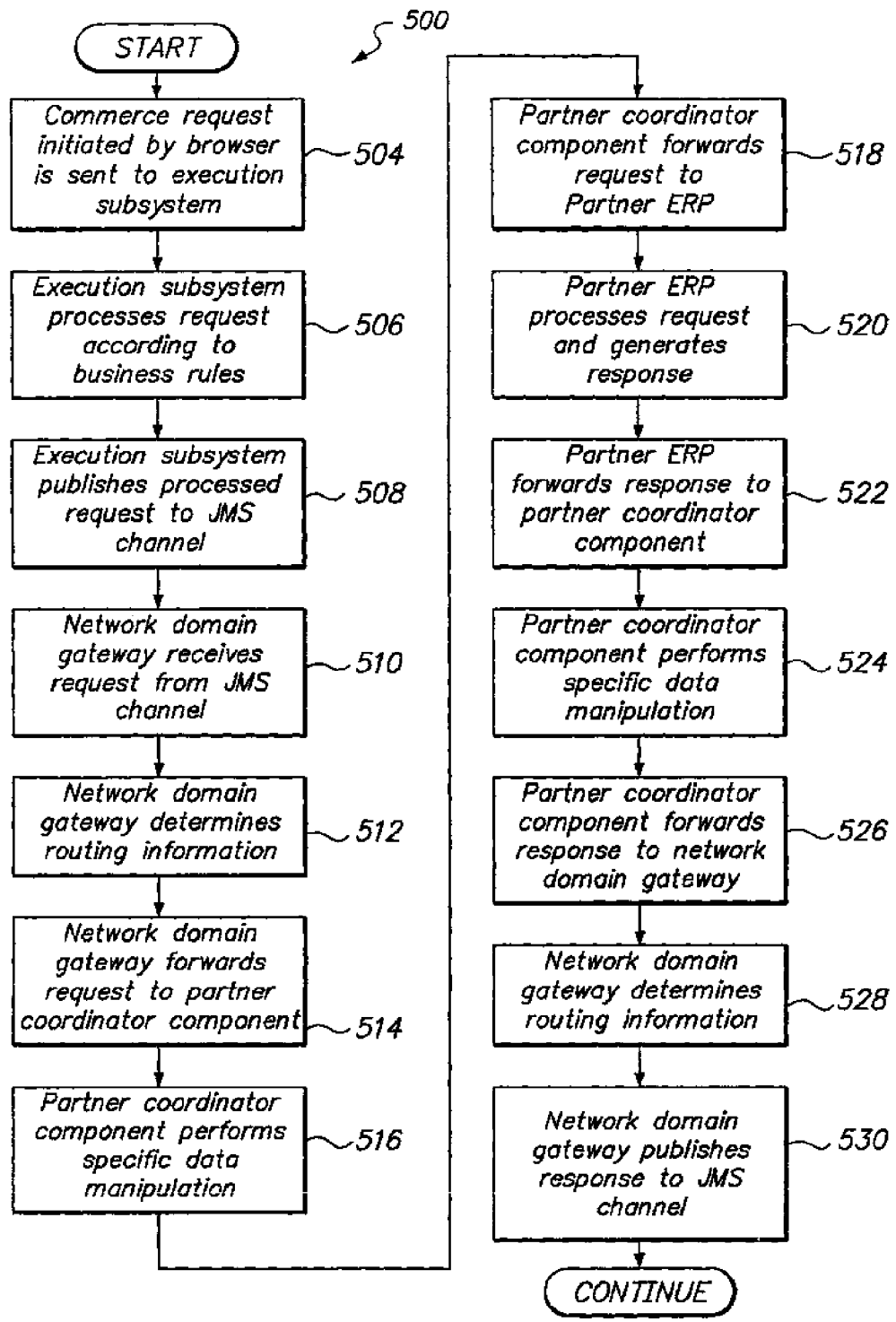
FIGS. 17A and 17B illustrates a flow chart of an exemplary method for a business-to-consumer transaction, according to an embodiment of the present invention.
Figure 17B:
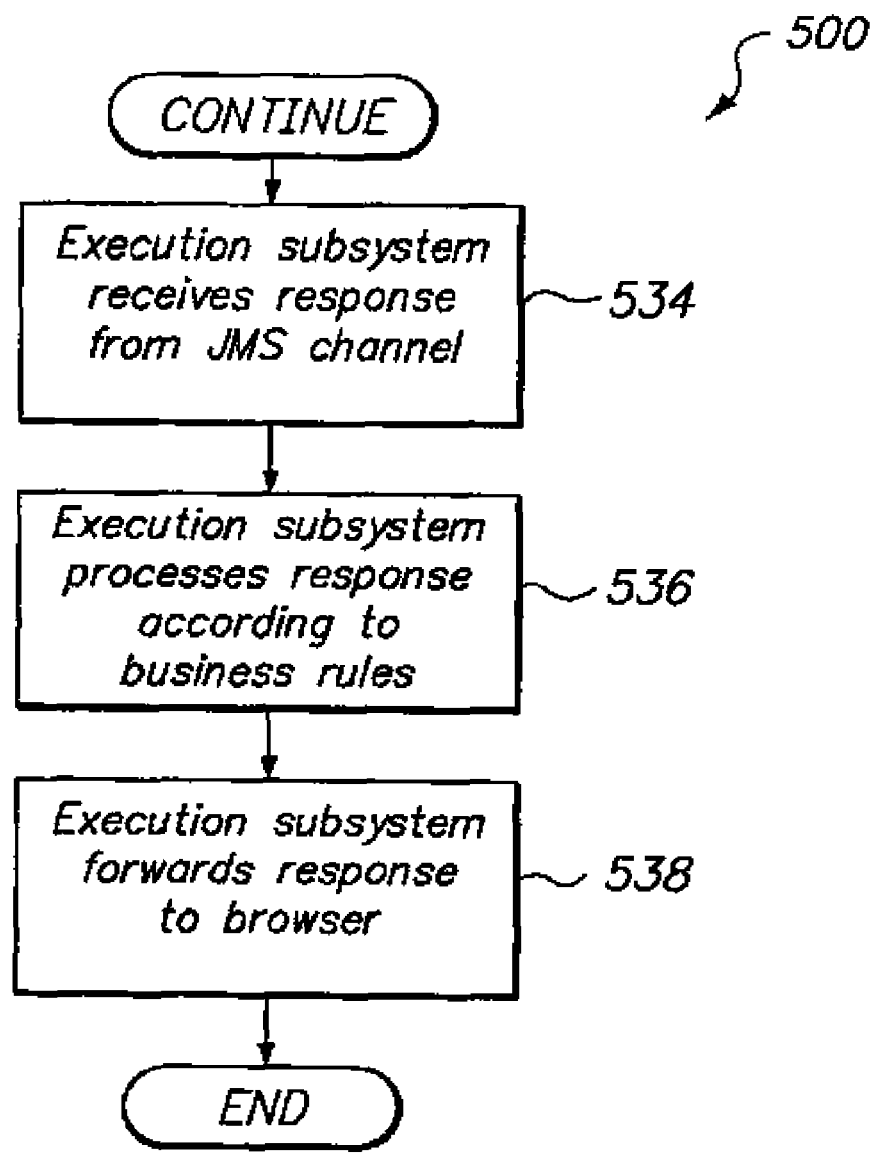

FIGS. 17A and 17B (collectively referred to as "FIG. 17") illustrate a flow chart of an exemplary method 500 for a B2C transaction, according to an embodiment of the present invention. Method 500 follows a typical B2C transaction for a browser-based business request to be fulfilled by a partner. This example assumes that routing is context based. The transaction can be initiated when an enterprise receives, for example, a purchase order from a customer. The enterprise may generate a commerce request for the purchase order.

Method 500 begins at step 504 where a commerce request initiated by the browser is sent to the execution subsystem 238 residing in the network domain 14. At step 506, the execution subsystem 238 processes the request according to the business rules for the request. The execution subsystem 238 may implement network execution component 214. These business rules may be stored in policy data repository 220. The business rules may dictate that a particular partner should handle the request, for example, to fill the purchase order. At step 508, the execution subsystem 238 publishes the processed request to an appropriate channel of the Java Messaging System (JMS) 236.

At step 510, the network domain gateway 114 receives the request from the JMS channel. The network domain gateway 114 may comprise or be a part of the gateway subsystem 234. At step 512, the network domain gateway 114 determines routing information for handling the request. At step 514, the network domain gateway 114 forwards the request to the partner coordinator component 180 in the partner domain 18 for the partner. The partner coordinator component 180 may comprise or be a part of a connection subsystem 228.

At step 516, the partner coordinator component 180 receives the request and performs the specific data manipulation required by the partner. The partner, in this example, can be a distributor of products for the enterprise. At step 518, the partner coordinator component 180 forwards the request to the partner ERP 226 system. The partner ERP 226 may be an example of an enterprise application 210.

At step 520, the partner ERP 226 system processes the request and generates a response for the partner. Processing of the request can be, for example, initiation of one or more actions by responsible persons at the partner to fill the order. The response may identify the order, and specify what actions will be taken by the partner to fill the order and when these actions will occur. At step 522, the partner ERP 226 forwards its response to the partner coordinator component 180. At step 524, the partner coordinator component 180 performs the specific data manipulation required by the partner. At step 526, the partner coordinator component 180 forwards the response to the network domain gateway 114 in the network domain 14.

At step 528, the network domain gateway 114 determines routing information to the appropriate execution process. At step 530, the network domain gateway 114 publishes the response to the JMS channel. At step 534, the execution subsystem 238 receives the response from the JMS channel. At step 536, the execution subsystem 238 processes the response according to the business rules defined for that process. This processing may include, for example, the consideration of the actions taken by the partner against service levels which have been agreed to by the partner, and the generation of a message to alert the enterprise if the partner is not meeting the expected service level.

At step 538, the execution subsystem 238 forwards the response to the appropriate browser to complete the transaction. This response may notify the customer of the particulars (e.g., within a particular time frame, and by a particular delivery service) for fulfillment of his/her order.

Business to Business Transaction

Figure 18:
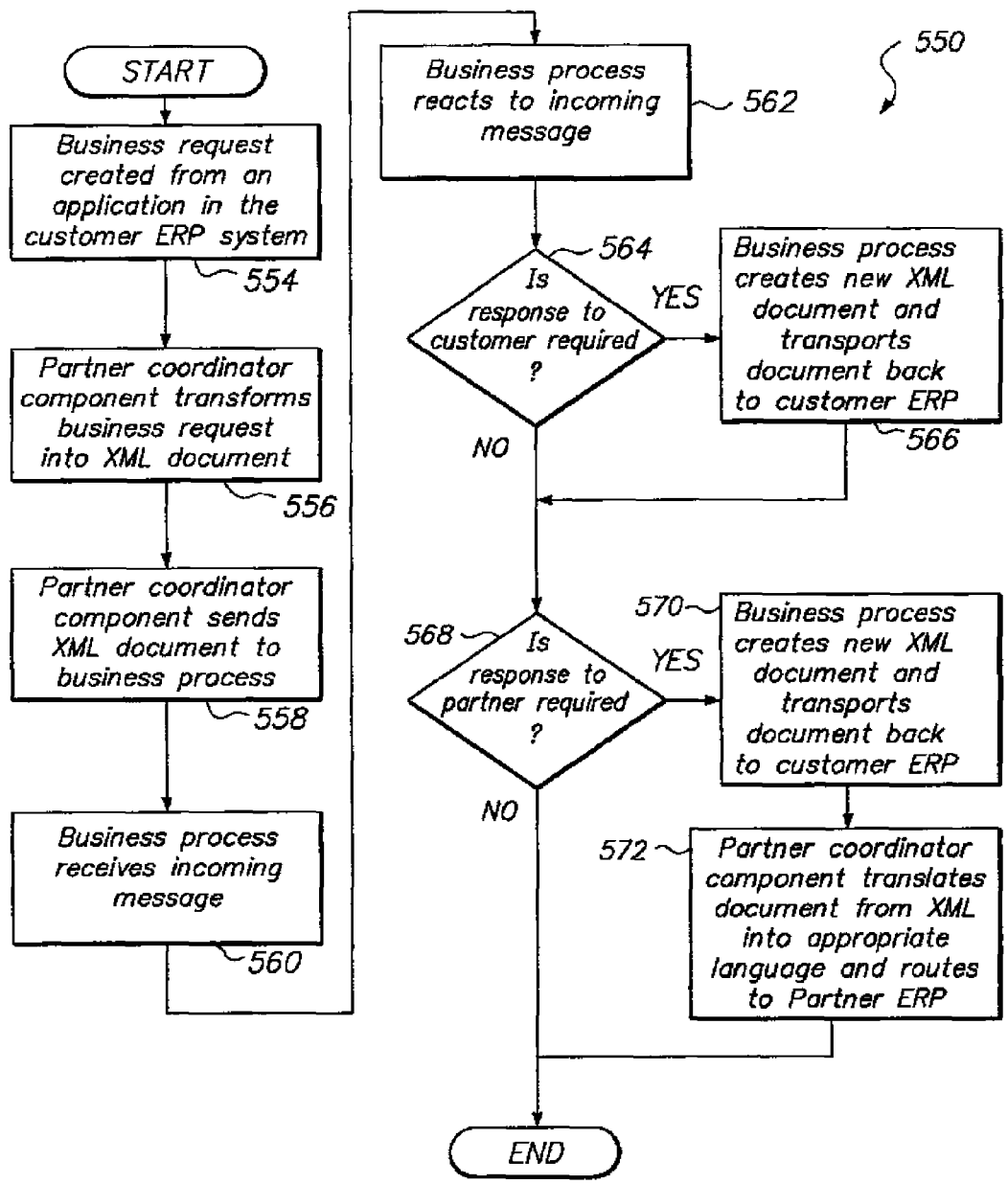
FIG. 18 illustrates a flow chart of an exemplary method for a business-to-business transaction, according to an embodiment of the present invention.

FIG. 18 illustrates a flow chart of an exemplary method 550 for a B2B transaction, according to an embodiment of the present invention. Method 550 follows a simple B2B message between a customer and a partner of an enterprise through the network 10. Each partner maintains its own separate partner domain 18 that communicates with the network domain 14. This example assumes that routing is context-based. The transaction can be initiated when an enterprise receives, for example, an order for a replacement part or a service repair from a customer. The enterprise may generate a business request for the purchase order.

Method 550 begins at step 554 where the business request is created by an application in a customer enterprise resource planning (ERP) system 182 or 226 in the customer domain 20. The customer ERP 226 may be an example of an enterprise application 210. At step 556, a partner coordinator component 180 transforms the business request into an eXtensible Markup Language (XML) document 184. The partner coordinator component 180 may handle data, translate messages, and execute processes. The partner coordinator component 180 may comprise or be a part of a connection subsystem 228. The partner coordinator component 180 may physically reside in the customer domain 20 or in the network domain 14. At step 558, the partner coordinator component 180 sends the XML document as a message, via XML message transport 186, to the network domain 14 for handling by a suitable business process 188. The business process 188 may be part of or running on network execution component 214 or an execution subsystem 238.

At step 560, business process 188 receives the incoming message, for example, according to the type of message. The message may relate to an existing process (e.g., a follow-up to a product order previously placed by the customer), or may cause initiation of a new process (e.g., a new order for a product or service).

At step 562, the business process 188 reacts to the incoming message in one of three ways. First, the business process 188 may read related business data from a business document 190 in the business data repositories 192. The business data repositories 192 maintain order and inventory information along with metadata information for the network 10. Using the business data, the business process 188 may determine that a particular one or more partners of the enterprise are most suited for carrying out tasks for handling the message. Second, the business process 188 may evaluate conditions and determine subsequent actions through the use of policies stored in the policy data repositories 194. This may include a consideration of which partner is bound by a service level that is appropriate for handling. For example, if a first partner has agreed to overnight delivery and a second partner has agreed to delivery in two or three days, then if the message requires immediate action, the first partner should be selected. Third, the business process 188 may update business data in the business document 190, and generate audit and process metrics. This provides monitoring of the partners so that it can be determined later whether the partners are meeting the agreed upon service levels.

At step 564, the business process determines whether a response to the customer is required. If a response to the customer is required, at step 566, a new XML document can be created at network domain 14 and transported back the customer ERP system in the customer domain 20.

At step 568, the business process determines whether a response to the partner is required. If a response to the partner is required, at step 570, the business process creates a new XML document and sends the document to the appropriate partner domain 18. At step 572, the partner coordinator component 180 translates the document from XML into a format capable of being read by a partner ERP system 198, and routes the document to the Partner ERP. The Partner ERP can then initiate and schedule action for handling of the message.

While particular embodiments of the present invention have been shown and described, it will be obvious to those skilled in the art that changes and modifications may be made without departing from this invention in its broader aspects and, therefore, the appending claims are to encompass within their scope all such changes and modifications as fall within the true spirit and scope of this invention.

What is claimed is:

1. A method comprising:
receiving, using a computing device, a business request from a first partner;
retrieving, over a network, using the computing device, real-time supply chain data relevant to the business request from a second partner, wherein the real-time supply chain data is retrieved via a coordinator component integrated with a system of the second partner;
generating, using the computing device, a context for the transaction using the real-time supply chain data;
processing, using the computing device, the business request according to business rules associated with the first partner and the context, the business rules defining a workflow comprising a plurality of tasks to be performed by the second partner;
routing, over the network, using the computing device, the plurality of tasks to the coordinator component integrated with a system of the second partner;
receiving, over the network, using the computing device, from the coordinator component integrated with a system of the second partner, a response to the plurality of tasks; and
routing, over the network, the response to the plurality of tasks to a coordinator component integrated with a system of the first partner.

2. The method of claim 1, wherein the request is converted into XML format prior to processing the request according to the business rules associated with the first partner.

3. The method of claim 1, wherein the response to the plurality of tasks is converted into XML format prior to transmitting the response to the plurality of tasks to the first partner.

4. The method of claim 1, further comprising:
storing the context in a network repository associated with a service provider.

5. The method of claim 1, wherein the request is a transaction type selected from the group consisting of: purchase order, service request, installation request, warranty matter and replacement request.

6. The method of claim 5, wherein the context comprises the transaction type, an identification of the first partner, an identification of the second partner, a date on which the request was initiated and a date on which the second partner completed the plurality of tasks.

7. A system for managing one or more transactions involving an enterprise and at least one partner in a supply chain, the system comprising:
a database, accessible to at least one computing device, the database operable to store real-time supply chain data relating to the one or more transactions, the database operable to maintain a respective context for each transaction; and
a data access layer, implemented using the at least one computing device, the data access layer operable to provide access to the real-time supply chain data relating to the transactions on existing systems of the enterprise and the partner;
a network domain gateway, implemented using the at least one computing device, the network domain gateway in communication with a network execution component operable to administer the one or more transactions for communication with a partner coordinator component integrated with an existing system of the partner to provide real-time data from an existing system of the partner,
an execution process engine, implemented using the at least one computing device, the execution process engine operable to execute a respective workflow in the context for each transaction using the real-time data, each workflow comprising a plurality of tasks to be performed by the enterprise or the partner in order to fulfill the respective transaction;
a plurality of process manager components, implemented using the at least one computing device, the plurality of process manager components operable to manage the workflows, wherein at least one business object is generated for each workflow;
a plurality of business object managers, implemented using the at least one computing device, the plurality of business object managers operable to manage each business object; and
a policy manager, implemented using the at least one computing device, the policy manager operable to maintain one or more business policies relating to the partner.

8. A computer readable storage media for tangibly storing thereon computer readable instructions for a method comprising:
receiving, using a computing device, a business request from a first partner;
retrieving, over a network, using the computing device, real-time supply chain data relevant to the business request from a second partner, wherein the real-time supply chain data is retrieved via a coordinator component integrated with a system of the second partner;
generating, using the computing device, a context for the transaction using the real-time supply chain data;
processing, using the computing device, the business request according to business rules associated with the first partner and the context, the business rules defining a workflow comprising a plurality of tasks to be performed by the second partner;
routing, over the network, using the computing device, the plurality of tasks to the coordinator component integrated with a system of the second partner;
receiving, over the network, using the computing device, from the coordinator component integrated with a system of the second partner, a response to the plurality of tasks; and
routing, over the network, the response to the plurality of tasks to a coordinator component integrated with a system of the first partner.

9. A system comprising:
at least one processor;
a storage medium for tangibly storing thereon program logic for execution by the at least one processor, the program logic comprising:
logic executed by the at least one processor for receiving, from a first partner, a business request from a first partner;
logic executed by the at least one processor for retrieving, over a network real-time supply chain data relevant to the business request from a second partner, wherein the real-time supply chain data is retrieved via a coordinator component integrated with a system of the second partner;
logic executed by the at least one processor for generating a context for the transaction using the real-time supply chain data;

logic executed by the at least one processor for processing the business request according to business rules associated with the first partner and the context, the business rules defining a workflow comprising a plurality of tasks to be performed by the second partner;

logic executed by the at least one processor for routing, over the network, using the computing device, the plurality of tasks to the coordinator component integrated with a system of the second partner;

logic executed by the at least one processor for receiving, over the network, using the computing device, from the coordinator component integrated with a system of the second partner, a response to the plurality of tasks; and logic executed by the at least one processor for routing, over the network, the response to the plurality of tasks to a coordinator component integrated with a system of the first partner.

* * * * *